US012442833B2

(12) United States Patent
Kim et al.

(10) Patent No.: US 12,442,833 B2
(45) Date of Patent: Oct. 14, 2025

(54) STRAIN SENSOR-BASED IMU SENSOR, AND INERTIAL MEASUREMENT SYSTEM COMPRISING SAME

(71) Applicant: KOREA INSTITUTE OF SCIENCE AND TECHNOLOGY, Seoul (KR)

(72) Inventors: Jinseok Kim, Seoul (KR); Minsu Jang, Seoul (KR); Byung Kook Kim, Seoul (KR); Kyumin Kang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 319 days.

(21) Appl. No.: 18/019,930

(22) PCT Filed: Aug. 4, 2021

(86) PCT No.: PCT/KR2021/010268
§ 371 (c)(1),
(2) Date: Feb. 6, 2023

(87) PCT Pub. No.: WO2022/031034
PCT Pub. Date: Feb. 10, 2022

(65) Prior Publication Data
US 2023/0288446 A1 Sep. 14, 2023

(30) Foreign Application Priority Data

Aug. 5, 2020 (KR) .......................... 10-2020-0098078

(51) Int. Cl.
*G01P 15/097* (2006.01)
*G01F 15/02* (2006.01)
(Continued)

(52) U.S. Cl.
CPC ............ *G01P 15/097* (2013.01); *G01F 15/02* (2013.01); *G01K 11/3206* (2013.01);
(Continued)

(58) Field of Classification Search
CPC .... G01P 15/097; G01P 15/0802; G01P 15/18; G01P 15/093; G01P 15/02; G01K 11/3206; G01K 1/26
See application file for complete search history.

(56) References Cited

U.S. PATENT DOCUMENTS 4,891,984 A * 1/1990 Fujii ..................... G01P 15/123
338/46
4,951,510 A * 8/1990 Holm-Kennedy ...... G01P 15/18
73/514.31
(Continued)

FOREIGN PATENT DOCUMENTS

CN 101210937 A 7/2008
CN 108731789 A 11/2018
(Continued)

OTHER PUBLICATIONS

Translation of CN101210937.*
(Continued)

*Primary Examiner* — Helen C Kwok
(74) *Attorney, Agent, or Firm* — NSIP Law

(57) ABSTRACT

Embodiments relate to an IMU sensor and an inertial measurement system comprising same, wherein the IMU sensor comprises: a core body including at least three surfaces each having a surface direction parallel to any one of three axes; a plurality of cantilevers configured to be deformable, one side of each cantilever being coupled to the core body; and a plurality of strain sensors each disposed on the surface of each cantilever, the strain sensors extending along the direction of the other side from one fixed side of the cantilever.

19 Claims, 30 Drawing Sheets

(51) Int. Cl.
  *G01K 11/3206* (2021.01)
  *G01P 15/02* (2013.01)
  *G01P 15/08* (2006.01)
  *G01P 15/093* (2006.01)
  *G01P 15/18* (2013.01)

(52) U.S. Cl.
  CPC ........ *G01P 15/0802* (2013.01); *G01P 15/093* (2013.01); *G01P 15/18* (2013.01)

(56) References Cited

U.S. PATENT DOCUMENTS

| | | | | |
|---|---|---|---|---|
| 5,659,139 | A | * | 8/1997 | Okada ...................... G01B 7/16 73/778 |
| 8,816,570 | B1 | * | 8/2014 | McConnell ......... G01P 15/0922 310/331 |
| 2005/0217378 | A1 | * | 10/2005 | Ishikawa ................ G01P 15/18 73/514.01 |
| 2007/0163346 | A1 | | 7/2007 | Platt et al. |
| 2015/0168440 | A1 | | 6/2015 | Kang et al. |
| 2023/0204360 | A1 | * | 6/2023 | Kim ....................... G01C 21/16 356/460 |

FOREIGN PATENT DOCUMENTS

| | | |
|---|---|---|
| JP | 9-105685 A | 4/1997 |
| JP | 2005-30796 A | 2/2005 |
| JP | 2008-112563 A | 5/2008 |
| JP | 5300077 B2 | 9/2013 |
| KR | 10-2007-0076546 A | 7/2007 |
| KR | 10-2011-0122416 A | 11/2011 |
| KR | 10-1193917 B1 | 10/2012 |
| KR | 10-1427810 B1 | 8/2014 |
| KR | 10-1698836 B1 | 1/2017 |
| WO | WO 2013/131197 A1 | 9/2013 |

OTHER PUBLICATIONS

Cardou, Philippe, et al. "A nonlinear program for angular-velocity estimation from centripetal-acceleration measurements." *IEEE/ASME Transactions on Mechatronics* vol. 16. Issue 5 (2010). pp. 932-944.

Gorasia, J. "Fiber optic gyroscopes." *Instrumentation Spring* (2010). pp. 1-17.

* cited by examiner

US 12,442,833 B2

STRAIN SENSOR-BASED IMU SENSOR, AND INERTIAL MEASUREMENT SYSTEM COMPRISING SAME

CROSS REFERENCE TO RELATED APPLICATIONS

This application is a U.S. national stage application of International Application No. PCT/KR2021/010268 filed on Aug. 4, 2021, which claims the benefit of Korean Patent Application No. 10-2020-0098078 filed on Aug. 5, 2020, in the Korean Intellectual Property Office, the entire disclosures of which are incorporated herein by reference for all purposes.

TECHNICAL FIELD

Embodiments of the disclosure relate to an inertial measurement unit (IMU) sensor for measuring an acceleration of an object, and more particularly, to an IMU sensor including a fiber Bragg grating (FBG) sensor and configured to measure a linear acceleration and/or an angular acceleration, and an inertial measurement system including the IMU sensor.

[Description of Government-Funded Research and Development]

This research is conducted under the support of the Ministry of Science and ICT, [Project Name: Research project for overcoming disability responding to super-population aging, Project Number: 1711124217, Sub-Project Number: 2E30090].

BACKGROUND ART

Inertial measurement unit (IMU) sensors are widely used as sensors for measuring accelerations and rotational velocities using accelerometers and gyroscopes. In general, IMU sensors are manufactured by using microelectromechanical systems (MEMS) technology and measure an acceleration and a rotational velocity in an electric/magnetic manner.

However, IMU sensors manufactured by using MEMS technology are highly affected by electromagnetic fields. Accordingly, in a measurement environment in which a measurement object is exposed to a high-intensity electromagnetic field, an error occurs, and drift that is the accumulation of errors over time increases.

Also, because an angular velocity sensor (e.g., a gyro sensor) mounted on a MEMS-based IMU detects only the amount of change in an angular velocity without a reference point, a lot of errors occur, and a measurement value is relatively inaccurate.

DISCLOSURE

Technical Problem

According to an aspect of the present application, there may be provided an inertial measurement unit (IMU) sensor including a plurality of cantilevers including surfaces with axes parallel to three axes as normal vectors and strain sensors coupled to the plurality of cantilevers.

There also may be provided an inertial measurement system for measuring a linear acceleration and/or an angular acceleration of an object to which an IMU unit is attached by using a signal of the IMU sensor.

Technical Solution

According to an aspect of the present application, an inertial measurement unit (IMU) sensor for measuring inertia of an object includes a plurality of cantilevers each having a surface including a first axis and a second axis and configured to be deformable, a core body coupled to the plurality of cantilevers, and a plurality of strain sensors respectively located on the plurality of cantilevers and each configured to detect a bending strain of a corresponding cantilever.

At least one from among the plurality of cantilevers may be coupled so that a direction of the first axis of the surface of the at least one cantilever faces an x-axis with respect to the core body, at least one other cantilever from among the plurality of cantilevers may be coupled so that a direction of the first axis of the surface of the at least one other cantilever faces a y-axis, and at least one other cantilever from among the plurality of cantilevers may be coupled so that a direction of the first axis of the surface faces a z-axis, wherein a linear acceleration or an angular acceleration for the object is measured based on a strain measurement result obtained from the plurality of strain sensors.

The IMU sensor may include six cantilevers as the plurality of cantilevers. Each of the six cantilevers may include a strain sensor aligned in a direction of the first axis on the surface, wherein two cantilevers from among the six cantilevers are coupled so that an axis parallel to the x-axis is a normal direction of the surface of each of the two cantilevers, other two cantilevers are coupled so that an axis parallel to the y-axis is a normal direction of the surface of each of the other two cantilevers, and remaining two cantilevers are coupled so that an axis parallel the z-axis is a normal direction of the surface of each of the remaining two cantilevers.

The six strain sensors may form three strain sensor pairs for measuring a linear acceleration of each of three axes or three strain sensor pairs for measuring an angular acceleration having a rotation axis of each of the three axes, wherein each of the six strain sensors is shared by a strain sensor pair for measuring a linear acceleration of any one of the three axes and a strain sensor pair for an angular acceleration having one same axis as a rotation axis.

When an external force having a linear acceleration component or an angular acceleration component is applied to the object, at least two cantilever pairs from among the six cantilevers may be deformed in response to the external force, wherein, in the pair of cantilevers, extending axes of one cantilever and the other cantilever are not parallel to each other.

A cantilever pair deformed when a linear acceleration is applied to the object may be coupled to the core body to have a surface direction facing a direction of the linear acceleration.

A cantilever pair deformed when an angular acceleration is applied to the object may be bent in a direction of the angular acceleration.

In the strain sensor pair for measuring the linear acceleration of any one of the three axes, one strain sensor may be used to measure an angular acceleration having another axis of the three axes as a rotation axis, and the other strain sensor may be used to measure an angular acceleration having a remaining axis of the three axes as a rotation axis.

The core body may have one surface with a larger area than other surfaces. At least one groove may be formed in the one surface, and at least one of the plurality of cantilevers may be coupled to the core body to be located in the at least one groove.

The plurality of cantilevers may include six or more cantilevers. The core body may have six surfaces having directions parallel to three axes as normal directions, and side surfaces of the six cantilevers may be respectively fixed to the six surfaces of the core body.

The core body may have a spherical shape.

At least one of the plurality of cantilevers may include a groove formed in one surface, wherein at least one of the plurality of strain sensors is located in the groove. The IMU sensor may further include a polymer layer formed on the at least one strain sensor located in the groove of the at least one cantilever.

The IMU sensor may further include a mass body fixed to a side surface opposite to one fixed side surface of the cantilever.

The IMU sensor may further include a plurality of through-holes formed between a portion where the mass body is projected onto a surface of the cantilever and a portion where the cantilever is coupled and fixed to the core body. A sensing portion of the strain sensor located on the surface of the cantilever may be located between the plurality of through-holes.

Each of the plurality of through-holes may extend in at least one of an extending direction of the cantilever in which the through-hole is formed and a direction perpendicular to the extending direction.

The cantilever may have a planar structure in which a portion located between one side and the other side of the cantilever has a smaller width than one side portion and the other side portion.

The IMU sensor may further include a temperature sensor located in the core body and configured to correct a change due to a temperature in a spectrum change of at least one of the six strain sensors.

The temperature sensor may be implemented as a fiber Bragg grating (FBG) sensor, wherein the FBG sensor is located in the core body. In the core body, a change in a wavelength spectrum of reflected light caused by an interval change between gratings due to a temperature change may be greater than a change in a wavelength spectrum of reflected light caused by an interval change between gratings due to a deformation of a cantilever due to a movement of the object to which the IMU sensor is attached.

At least one of the plurality of cantilevers may include: a first elastic layer; a viscoelastic layer; and a second elastic layer, wherein the strain sensor is located on the second elastic layer.

The strain sensor may be configured to measure a degree or a direction of bending of the cantilever by inertia according to a linear acceleration or an angular acceleration of the object.

An FBG sensor that is an optical fiber-based strain sensor may be used as the strain sensor, and the FBG sensor may be a sensor in which gratings with different refractive indices are formed at a center of an optical fiber with at least one of a regular interval, an irregular interval, or a combination thereof; and a sensor that reflects only light of a specific wavelength according to the interval of the gratings; and the FBG sensor is configured to measure a strain when a grating interval and a wavelength change due to a change in a length and a temperature.

According to another aspect of the present application, an inertial measurement system includes the IMU sensor according to the above embodiments, a light source configured to emit light to the FBG sensor, and a measurement device configured to receive a wavelength spectrum set from a plurality of FBG sensors, wherein the wavelength spectrum set includes a wavelength spectrum of reflected light output from each of the plurality of FBG sensors. The measurement device may be configured to detect a change in a wavelength spectrum of reflected light caused by an interval change between gratings due to deformation of a cantilever caused by a movement of an object to which the IMU sensor is attached to calculate a strain corresponding to the movement of the object.

The measurement device may be configured to determine the cantilever deformed by the movement of the object by detecting the change in the wavelength spectrum of reflected light, determine a deformation direction of the cantilever based on a wavelength spectrum change sign corresponding to the deformed cantilever, and measure a linear acceleration of the object based on the deformation direction and the strain.

When there are at least two deformed cantilevers and deformation directions of the at least two deformed cantilevers include different axis directions, the measurement device may be further configured to determine a rotation direction based on the deformation directions of the at least two deformed cantilevers, and additionally measure an angular acceleration of the object further based on the determined rotation direction and the linear acceleration.

The measurement device may be configured to store information about a cantilever corresponding to each wavelength spectrum in the wavelength spectrum set, wherein the information about the cantilever includes at least one of identification information of the cantilever, a bending axis of the cantilever, and a deformation direction of a surface of the cantilever.

The measurement device may be further configured to calculate a gravity correction value based on a change in a wavelength spectrum corresponding to a cantilever having a z-axis as a surface direction, and apply the gravity correction value to the change in the wavelength spectrum corresponding to the cantilever having the z-axis as the surface direction in the detected wavelength spectrum set.

The measurement device may be further configured to calculate a temperature correction value based on a change in a wavelength spectrum of reflected light caused by a grating change of a temperature correction grating node, and apply the temperature correction value to the detected wavelength spectrum set.

The inertial measurement system may further include an input shaping filter configured to remove residual vibration.

Advantageous Effects

Because an inertial measurement system according to an aspect of the present disclosure uses an inertial measurement unit (IMU) sensor including a strain sensor, even when there is a large magnetic field in a measurement environment, drift that is the accumulation of errors over time due to the magnetic field does not occur.

Also, the strain sensor of the IMU sensor may be located on a surface of each of a plurality of cantilevers coupled in a 6-degrees of freedom (DOF) structure, and a rotational velocity (e.g., an angular acceleration) may also be measured with only an acceleration sensor configured to measure an acceleration (e.g., a linear acceleration).

Also, because the inertial measurement system may correct error factors in acceleration measurement including, for example, gravity, temperature, and/or residual vibration due to deformation of a cantilever, more accurate acceleration measurements may be made. In particular, because the inertial measurement system may apply all algorithm technology used for more accurate acceleration measurements such as a complementary filter and/or a Kalman filter, the inertial measurement system has high compatibility.

However, technical effects of the present application are not limited thereto, and other unmentioned technical effects will be apparent to one of ordinary skill in the art from the description of the claims.

DESCRIPTION OF DRAWINGS

The following is a brief introduction to necessary drawings in the description of the embodiments to describe the technical solutions of the embodiments of the present application or the existing technology more clearly. It should be understood that the accompanying drawings are for the purpose of describing the embodiments of the present disclosure and are not intended to be limiting of the present disclosure. Additionally, for clarity of explanation, some elements to which various modifications such as exaggeration and omission are applied may be illustrated.

DESCRIPTION OF REFERENCE NUMERALS

Figure 1:
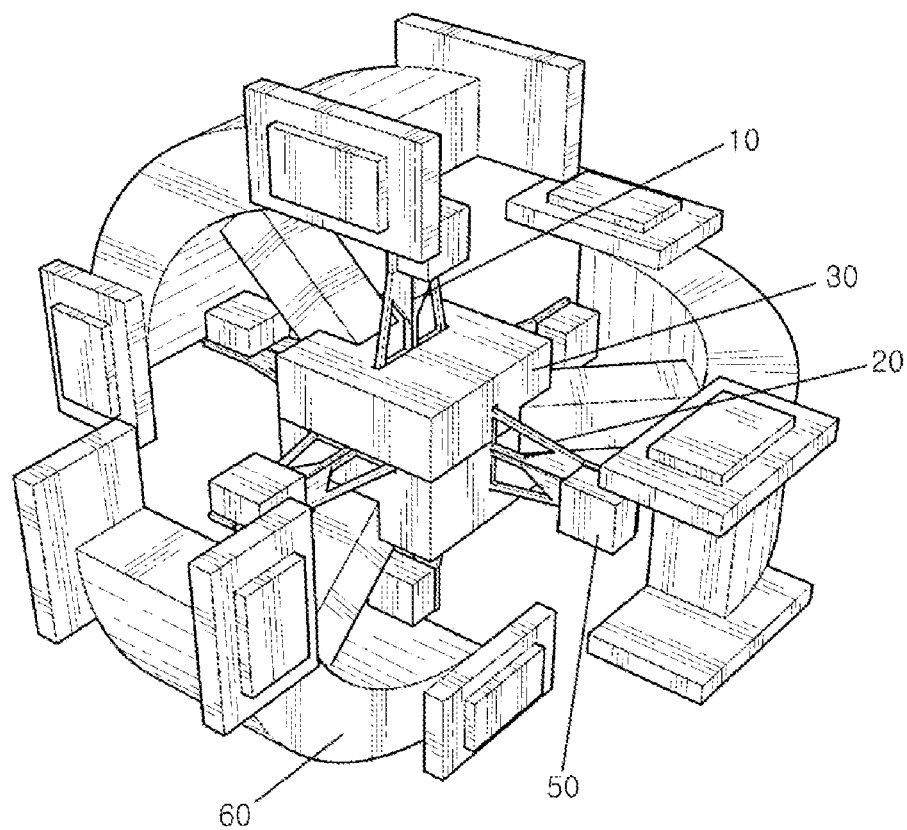
FIG. 1 is a conceptual view illustrating an inertial measurement system, according to an embodiment of the present application.

1: inertial measurement system
10: strain sensor
20: cantilever
30: core body
50: mass body
60: rail
100: IMU sensor
200: light source
300: measurement device

MODE FOR INVENTION

The terms used in the present application are merely used to describe specific embodiments, and are not intended to limit the present application. As used in the present application and the attached claims, the singular forms "a," "an," and "the" are intended to include the plural forms as well, unless the context clearly indicates otherwise. Also, as used in the present application, the term "and/or" includes any and all combinations of one or more of the associated listed items.

It will be understood that although the terms "first," "second," etc. may be used herein to describe various portions, components, areas, layers, and/or sections, these portions, components, areas, layers, and/or sections should not be limited by these terms. These elements are only used to distinguish one portion, component, area, layer, or section from another. Accordingly, a first portion, component, area, layer, or section could be termed a second portion, component, area, layer, or section, without departing from the scope of the present application.

The terminology used herein is for the purpose of describing particular embodiments only and is not intended to be limiting of the present application. Unless expressly stated to the contrary, the singular forms as used herein include the plural forms as well. The term "comprises" used herein specifies the presence of stated features, regions, integers, steps, operations, items, and/or components, but does not preclude the presence or addition of one or more other features, regions, integers, steps, operations, items, and/or components.

Unless otherwise defined, all terms including technical and scientific terms used herein have the same meaning as commonly understood by one of ordinary skill in the art to which the present application pertains. It will be further understood that terms, such as those defined in commonly used dictionaries, should be interpreted as having a meaning that is consistent with their meaning in the context of the relevant art document and the present disclosure, and will not be interpreted in an idealized or overly formal sense unless expressly so defined herein.

The present application will now be described more fully with reference to the accompanying drawings, in which embodiments of the present application are shown.

Figure 2:
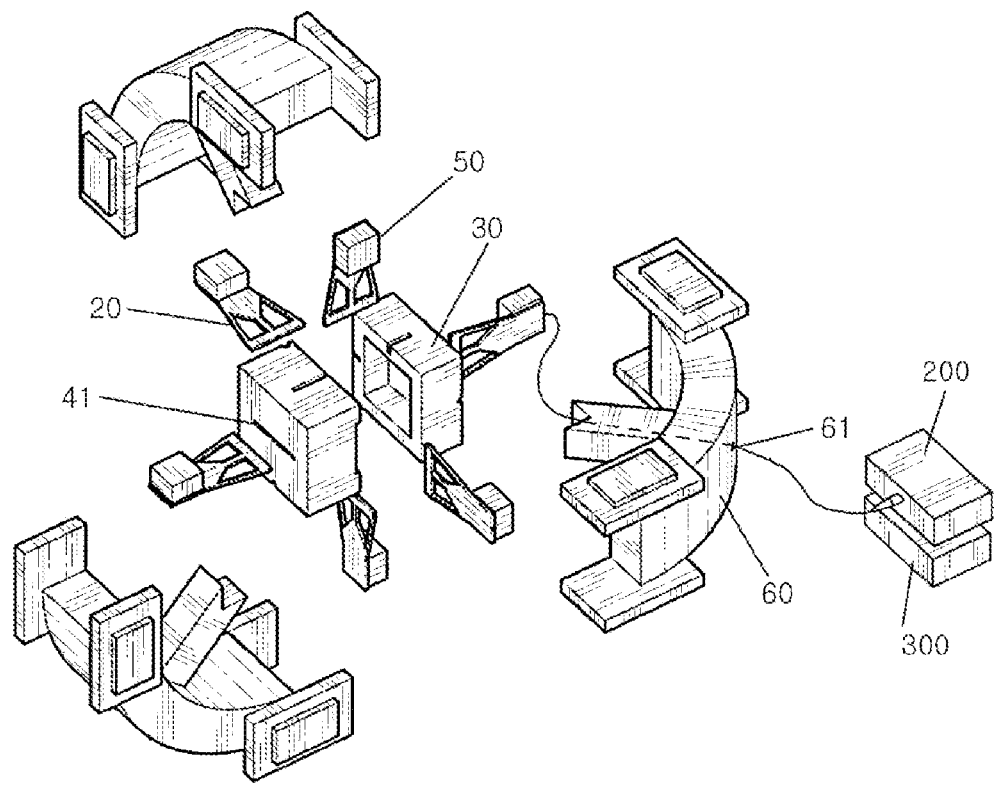
FIG. 2 is a view illustrating an inertial measurement unit (IMU) sensor, according to an embodiment of the present application.

FIG. 1 is a view illustrating an inertial measurement unit (IMU) sensor, according to an embodiment of the present application. FIG. 2 is a conceptual view illustrating an inertial measurement system including the IMU sensor of FIG. 1. In FIG. 2, the IMU sensor of FIG. 1 is shown in an exploded perspective view.

Referring to FIGS. 1 and 2, an inertial measurement system 1 includes an IMU sensor 100, a light source 200, and a measurement device 300. In specific embodiments, the inertial measurement system 1 may further include a fixture (not shown) for fixing the IMU sensor 100 to a user's body. The fixture may be a band and/or a shoe including a fixing portion of the IMU sensor 100.

The IMU sensor 100 that is a sensor for measuring inertia of an object is configured to use a strain sensor rather than an electromagnetic method. The strain sensor may be a sensor that measures a strain with a change in resistance and/or capacitance due to deformation of a conductive material, or an optical fiber-based strain sensor.

In an embodiment, the IMU sensor 100 may include a plurality of strain sensors. The IMU sensor 100 may measure a linear acceleration or an angular acceleration of the object based on strain measurement results obtained from the plurality of strain sensors.

In an embodiment, the IMU sensor 100 may include a fiber Bragg grating (FBG) sensor having a least a part formed of an optical fiber. For clarity of explanation, the present application will be described in more detail based on embodiments in which an FBG sensor is used as a strain sensor. However, the technical sprit of the present application is limited to the strain sensor of the FBG sensor, and it will be understood by one of ordinary skill in the art that the technical sprit of the present application is applied to various optical fiber-based strain sensors other than the FBG sensor, or sensors for measuring a strain with a change in resistance and/or capacity due to deformation of a conductive material.

The FBG sensor may be used to measure information about a change in an acceleration and/or an angular acceleration of the object when a cantilever corresponding to a specific movement is partially deformed in response to a movement of the object to which the IMU sensor 100 is attached. An optical fiber (not shown) of the IMU sensor 100 is connected to the light source 200.

The light source 200 emits light to the optical fiber of the IMU sensor 100. The optical fiber of the IMU sensor 100 is configured to receive light and output reflected light around a portion with an FBG node.

The measurement device 300 may receive a signal (e.g., reflected light) output from the IMU sensor 100, and may measure physical information (e.g., linear acceleration information or angular acceleration information) of the object to which the IMU sensor 100 is attached based on the received signal. In specific embodiments, when the measurement device 300 receives reflected light of the IMU sensor 100 through a circulator (not shown), the measurement device 300 may convert the linear acceleration information and the angular acceleration information into position and angle changes through an algorithm and integral calculation.

A physical information measurement process of the measurement device 300 will be described in more detail with reference to FIGS. 5 to 11.

The measurement device 300 according to embodiments may be entirely hardware, entirely software, or partially hardware and partially software. For example, a system may collectively refer to hardware having data processing capability and operating software for driving the hardware. In the specification, the term such as "unit", "module", "device", or "system" is indented to refer to a combination of hardware and software driven by the hardware. For example, hardware may be a data processing device including a data processing unit (CPU), a graphics processing unit (GPU), or another processor. Also, software may be a running process, an object, an executable file, a thread of execution, or a program.

In specific embodiments, a commonly used complementary filter or Kalman filter may be applied to the software, or a filter optimized for data processing of the present FBG-based IMU may be applied to the software. In addition, a unique algorithm and/or filter technology for separating an angular acceleration and a linear acceleration may be applied to the software.

As shown in FIGS. 1 and 2, the IMU sensor 100 may include a plurality of FBG sensors 10, a plurality of cantilevers 20, and a core body 30. In specific embodiments, the IMU sensor 100 may further include a mass body 50, a rail 60, and/or a cap (not shown). The rail 60, the cap, etc. are used to protect the sensor. The FBG sensor includes an optical fiber, and when the FBG sensor 10 is at least partially deformed, the FBG sensor 10 detects a physical factor causing the deformation (e.g., a 10 temperature and/or an external force).

Figure 3:
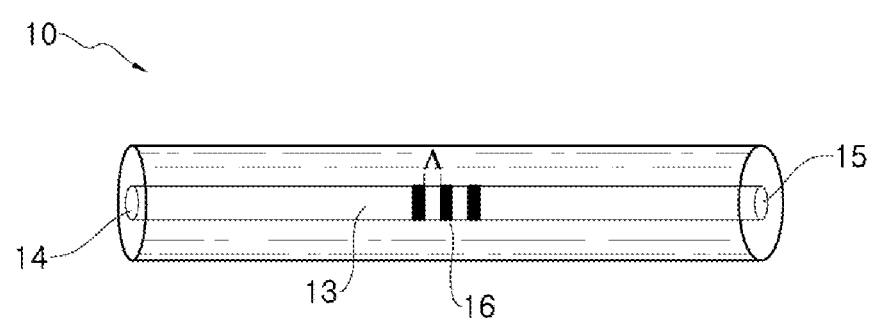
FIG. 3 is a conceptual view illustrating a fiber Bragg grating (FBG) sensor, according to an embodiment of the present application.

FIG. 3 is a conceptual view illustrating an FBG sensor, according to an embodiment of the present application.

Referring to FIG. 3, the FBG sensor 10 is configured to form a grating node in a portion of an optical fiber 11 elongating in one axis direction. The grating node includes a plurality of gratings.

Although a rating node 16 is mainly illustrated in FIG. 3 for convenience, it will be understood that the remaining portion of the optical fiber 11 not including gratings may elongate from the left and right of the grating node 16. The remaining portion of the optical fiber 11 extending from the left and right of the grating node 16 functions as a path through which light is transmitted into the optical fiber 11, and a length and a displacement of the remaining portion of the optical fiber 11 do not affect detection of a movement. In other words, a length of the remaining portion of the optical fiber 11 other than the grating node 16 may be adjusted when necessary, and an extending direction of the remaining portion of the optical fiber 11 may also be adjusted in various ways.

According to the present embodiment, the optical fiber 11 includes a cladding 12 formed of a glass material and being freely bent, and a core 13 formed in a longitudinal direction of the cladding 12 at the center of the cladding 12. A refractive index of the cladding 12 and a refractive index of the core 13 are different from each other. For example, a refractive index of the cladding 12 is n1, and a refractive index of the core 13 is n0, and n1 and n0 are different from each other. A light inlet 14 through which light is incident form a light source (not shown) and a light outlet 15 through which light is output through the core 13 are formed at both ends of the optical fiber 11.

The grating node 16 that includes a set of n (n≥2, natural number) gratings is formed in the core 13 of a portion of the optical fiber 11. The FBG sensor 10 may include at least one grating node 16.

The gratings with a grating pattern are formed in the core 13 through ultraviolet light in a process of manufacturing the optical fiber 11, and have a refractive index (e.g., n0+Δn) different from refractive indices of the cladding 12 and the core 13.

A plurality of gratings may include at least one of gratings having a constant interval Λ between gratings, gratings having a non-constant interval Λ between gratings, and a combination thereof, and may be located in the optical fiber 11. An interval between grating nodes is much greater than the interval Λ between gratings of a grating node. The interval Λ between gratings may vary. For example, the grating intervals Λ may be the same. Alternatively, at least one grating interval Λ may be different from at least one of the other grating intervals Λ.

According to the above configuration, light incident on the light inlet 14 of the optical fiber 11 causes interference by the grating nodes. Reflected light output back from the light inlet 14 may be expressed as a wavelength spectrum having a peak corresponding to each grating node.

In the wavelength spectrum of the reflected light output from the light inlet 14 of the FBG sensor 10, the grating interval Λ of the grating node and a wavelength λ of the reflected light have the relationship as shown in Equation 1.

$$\lambda_B = 2 {}^* n_{eff} {}^* \Lambda \qquad \text{[Equation 1]}$$

Here, neff is an index indicating an effective refractive index of the core.

As shown in Equation 1, a Bragg wavelength λB of light reflected by the grating is a function between the effective refractive index neff and the grating interval Λ. The effective refractive index and the grating period are a function between a temperature and a strain. When a temperature or a strain in the grating node 16 is disturbed, the Bragg wavelength $\lambda_B$ of the light reflected by the grating is changed. The cantilever 20 is configured to cause deformation of at least one grating node 16 in the FBG sensor 10.

The cantilever 20 may include one surface including a horizontal axis and a vertical axis. A plurality of FBG sensors 10 may be respectively provided on a plurality of cantilevers 20. For example, the FBG sensor 10 may be located on the one surface of the cantilever 20. The FBG sensor 10 may be stably located on the one surface. Alternatively, the FBG sensor 10 may be located in the cantilever 20.

The FBG sensor 10 is located to measure a strain in a longitudinal direction of the cantilever 20. Also, the FBG sensor 10 is far from a fixed axis of bending deformation with a strain of 0 (i.e., a coupling portion with the core body 30 of FIG. 2). In this case, even when the same bending deformation occurs, the grating interval Λ is greatly changed, compared to a case where the FBG sensor 10 is close to the fixed axis of bending deformation.

Also, the FBG sensor is located on the surface one cantilever 20, and the cantilever 20 may be partially or entirely deformed in response to a movement of an object to which the IMU sensor 100 is attached. The cantilever 20 supports the FBG sensor 10, and when the cantilever 20 is not deformed, the FBG sensor 10 is not deformed. To this end, the cantilever 20 may be formed of any of various deformable materials, for example, a flexible material. The flexible material may include any of various polymer materials such as UV epoxy or ethyl vinyl ether (EVE). However, the flexible material is not limited thereto, and may include any of various non-magnetic metal materials such as polycarbonate (PC), polyether ether ketone (PEEK), Vero, Tango, carbon steel, or spring steel which may be shaped and/or 3D printed, in addition to the polymer material. That is, the flexible material may include any of most elastic materials except for a ceramic material.

In an embodiment, the cantilever 20 may be configured to be bent in a normal direction of a surface with respect to a bending axis in the IMU sensor 100. The bending axis refers to a portion that is formed when the cantilever 20 and the core body 30 are coupled to each other and that fixes a portion of the cantilever 20. When the cantilever 20 is deformed, the FBG sensor 10 is also deformed. When the cantilever 20 is bent, the FBG sensor 10 is stretched/contracted in an axis direction of the FBG sensor 10 due to deformation of the cantilever 20. An interaction between the FBG sensor 10 and the cantilever 20 will be described below in more detail with reference to FIG. 5.

In addition, the cantilever 20 may have a planar design for the IMU sensor 100 with a higher sensitivity. For a higher sensitivity, the cantilever 20 may include one or more through-holes, or may be designed to have a planar structure in which a part of the cantilever 20 is slimmer than another part.

For clarity of explanation, an operation of the IMU sensor 100 when the object to which the IMU sensor 100 is attached moves based on embodiments with a plurality of through-holes (e.g., two holes) will be described in more detail.

Figure 4:
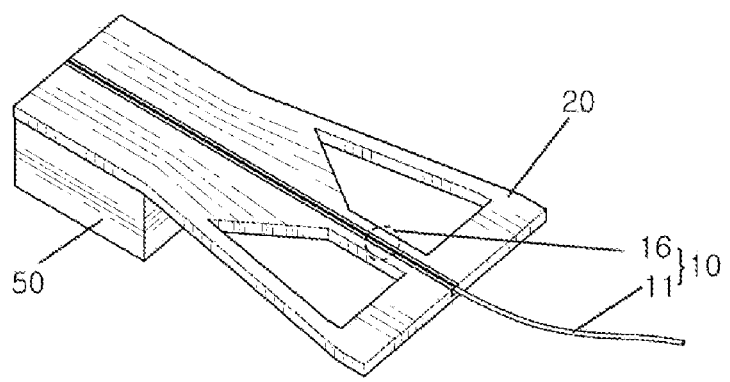
FIG. 4 is an enlarged view illustrating a cantilever portion of the IMU sensor of FIG. 2.

FIG. 4 is an enlarged view illustrating a cantilever portion of the IMU sensor of FIG. 2.

Referring to FIG. 4, the FBG sensor 10 may be provided in a groove formed in one surface of the cantilever 20.

In an embodiment, a process of manufacturing the IMU sensor 100 may include: forming a cantilever structure formed of a bendable material; forming a groove in one surface of the cantilever structure; and locating the FBG sensor 10 in the groove. At least one grating node of the FBG sensor 10 is located in a portion where the cantilever 20 is bent.

Also, the process of manufacturing the IMU sensor 100 may further include attaching the mass body 50.

In an embodiment, the mass body 50 is attached to a side opposite to a side surface where the cantilever 20 is coupled to the core body 30, that is, the other side of the cantilever 20. However, the mass body 50 does not need to be attached to an end of the other side of the cantilever 20. In other embodiments, the mass body 50 may be attached to a central portion of the cantilever, or any of side surfaces other than the coupled side surface. The mass body 50 and the cantilever 20 constitute one vibrometer. When the same external force that causes an acceleration is applied to the vibrometer, the vibrometer has a larger physical change than a vibrometer including only the cantilever 20. Accordingly, more accurate acceleration measurements may be made.

In some embodiments, the mass body 50 may be attached to a surface opposite to the surface of the cantilever 20 in which the groove is formed. In other embodiments, the mass body 50 may be attached to both the surface of the cantilever 20 in which the groove is formed and the surface opposite to the surface in which the groove is formed.

In an embodiment, when one surface of the cantilever 20 further includes a plurality of through-holes, the through-holes may be formed between the mass body 50 and the core body 30. The through-holes may each have any of various shapes such as a trapezoidal shape, a quadrangular shape, or a circular shape. In some embodiments, the plurality of through-holes are formed between a portion where the mass body is projected onto a surface of the cantilever 20 and a portion where the cantilever 20 is coupled and fixed to the core body 30.

Also, the grating node 16 of the sensor 10 may be located between the plurality of through-holes. For example, the FBG sensor 10 may be disposed so that the grating node 16 of the FBG sensor 10 is located between through-holes having trapezoidal shapes.

Also, the process of manufacturing the IMU sensor 100 may further include applying a polymer to the cantilever 20 on which the FBG sensor 10 is located. The polymer may include a viscoelastic or hyper-elastic material. Due to the applying of the polymer, the cantilever 20 and a polymer layer form a sandwich structure around the FBG sensor 10. The sandwich structure may improve damping of the cantilever 20. In this case, when an external force is applied to deform the cantilever 20, residual vibration unrelated to the external force may be reduced. The applying of the polymer for the sandwich structure is merely an example, and a polymer may be deposited by using coating, shaping, or 3D printing.

The core body 30 is coupled to a plurality of cantilevers 20. In an embodiment, at least one cantilever 20 from among the plurality of cantilevers may be coupled to the core body 30 so that a direction of the first axis of the surface of the cantilever faces an x-axis. Also, at least one other cantilever 20 from among the plurality of cantilevers may be coupled to the core body 30 so that a direction of the first axis of the surface of the cantilever faces a y-axis. Also, at least one other cantilever 20 from among the plurality of cantilevers may be coupled to the core body 30 so that a direction of the first axis of the surface faces a z-axis.

To this end, in an embodiment, the core body 30 may be formed to have at least three surfaces having the x-axis, the y-axis, and the z-axis as surface directions. Although the core body 30 may be, for example, a hexahedron as shown in FIG. 2, the present application is not limited thereto, and the core body 30 may be any of various polyhedrons having surfaces of the three axes directions such as an octahedron.

In another embodiment, the core body 30 may be spherical. In this case, the plurality of cantilevers 20 are coupled to the center point of the core body 30 with respect to the three axes.

The core body 30 is configured to fix one side of the cantilever 20. In this case, the other side of the cantilever 20 opposite to the core body 30 undergoes relatively large deformation.

The core body 30 is configured to organize optical fiber. In an embodiment, in order to fix one side surface of the cantilever 20, the core body 30 may include a coupling mount 31 coupled to the one side surface. In some embodiments, the coupling mount 31 may be formed as a groove passing through the inside and the outside of the core body 30. Alternatively, the core body 30 may be manufactured in an integrated type and/or an assembly type.

Referring back to FIG. 2, the coupling groove may be formed so that a cross-section of the coupling groove corresponds to a cross-section of the one side of the cantilever 20, and when the one side surface of the cantilever 20 is coupled to the coupling groove, the one side surface of the cantilever 20 is fixed to the core body 30. A portion where the cantilever 20 is coupled and fixed to the core body 30 may function as a bending axis of deformation along which the cantilever 20 is bent.

The core body 30 is configured so that the FBG sensor 10 passes through the inside of the core body 30. In an embodiment, as shown in FIG. 2, a part of the FBG sensor 10 may be located in the core body 30 through the coupling groove of the core body 30.

In another embodiment, the core body 30 may further include a groove 32 passing through the inside of the core body 30 and the coupling mount 31. In this case, the core body 30 may further include the groove 32 that allows the FBG sensor 10 located on the cantilever 20 to be introduced into the core body 30. In this case, an optical fiber portion of the FBG sensor 10 is introduced into the core body 30 through the groove 32. The optical fiber groove 32 in the core body 30 is formed to correspond to a groove 61 of the rail 60 for introducing the optical fiber, and thus, the FBG sensor 10 is discharged to the outside through the rail 60.

The FBG sensor 10 located on the cantilever 20 may be connected to the measurement device 300 through the groove 61 of the rail 60. As shown in FIG. 2, the FBG sensor 10 may pass through the core body 30 and may be located on the rail 60, and may pass through the groove 61 of the rail 60 and may be connected to the measurement device 300.

The measurement device 300 includes a data acquisition (DAQ) unit for receiving a signal and collecting data, and/or a data processing unit. The DAQ unit may include an avalanche photodiode (APD), a microcontroller unit (MCU), and/or an optical spectrum analyzer (OSA) for obtaining reflected light output from the optical fiber in a time domain. Also, the data processing unit may be a data processing device including a processor.

The measurement device 300 may receive reflected light of each FBG sensor included in the IMU sensor 100. In this case, the measurement device 300 may obtain a wavelength spectrum for each FBG sensor 10 based on the reflected light. Also, the measurement device 300 may process acceleration measurement data of 10 the inertial measurement system 1 in real time.

The measurement device 300 may detect a change in the reflected light from the wavelength spectrum for each FBG sensor 10. In this case, the measurement device 300 may determine the cantilever 20 that is deformed (e.g., bent) in response to a movement of an object based on the detected change in the reflected light (i.e., the change in the wavelength spectrum). Also, the measurement device 300 may calculate a strain of the cantilever 20 that is determined to be deformed. Also, the measurement device 300 may determine a movement direction of the object and a linear acceleration and/or an angular acceleration of the object according to a coupling structure of the cantilever 20.

In an embodiment, the measurement device 300 may calculate a linear acceleration of the object to which the IMU sensor 100 is attached based on the strain of the cantilever 20 deformed in response to the movement of the object. A method of calculating a linear acceleration using a strain will be described below in more detail with reference to FIGS. 6 and 7.

Also, the measurement device 300 may measure a rotation direction (or an angular acceleration) based on the strain of the cantilever 20 deformed in response to the movement of the object that rotates. A method of determining a rotation direction will be described below in more detail with reference to FIGS. 10 and 11.

As such, the measurement device 300 may identify a linear acceleration and an angular acceleration of the object by identifying a deformed cantilever pair.

Also, the measurement device 300 may pre-store information about the cantilever 20 corresponding to the wavelength spectrum. For example, the measurement device 300 may store information indicating that a cantilever corresponding to a first wavelength spectrum is a cantilever 20A, for example, identification information of the cantilever 20A as a specific wavelength spectrum.

Also, the measurement device 300 may pre-store deformation information of the cantilever 20. For example, the deformation information may include at least one of information indicating that a bending axis of the cantilever 20A is the x-axis and information indicating that a deformation direction of the cantilever 20A is +z.

This will be described below in more detail with reference to FIGS. 5 to 10.

The inertial measurement system 1 includes a set of FBG sensors 10 and cantilevers 20 in which each FBG sensor 10 is located on each cantilever 20 to measure a linear acceleration and/or an angular acceleration. A plurality of cantilevers 20 in the set extend in one axis direction, and each extending direction is parallel to any one of the three axes.

The IMU sensor 100 may include one or more first cantilevers 20 having an extending axis parallel to the x-axis, one or more second cantilevers 20 having an extending axis parallel to the y-axis, and one or more third cantilevers 20 parallel to the z-axis.

In an embodiment, the IMU sensor 100 may include at least two first cantilevers 20, at least two second cantilevers 20, and at least two third cantilevers 20.

Figure 5:
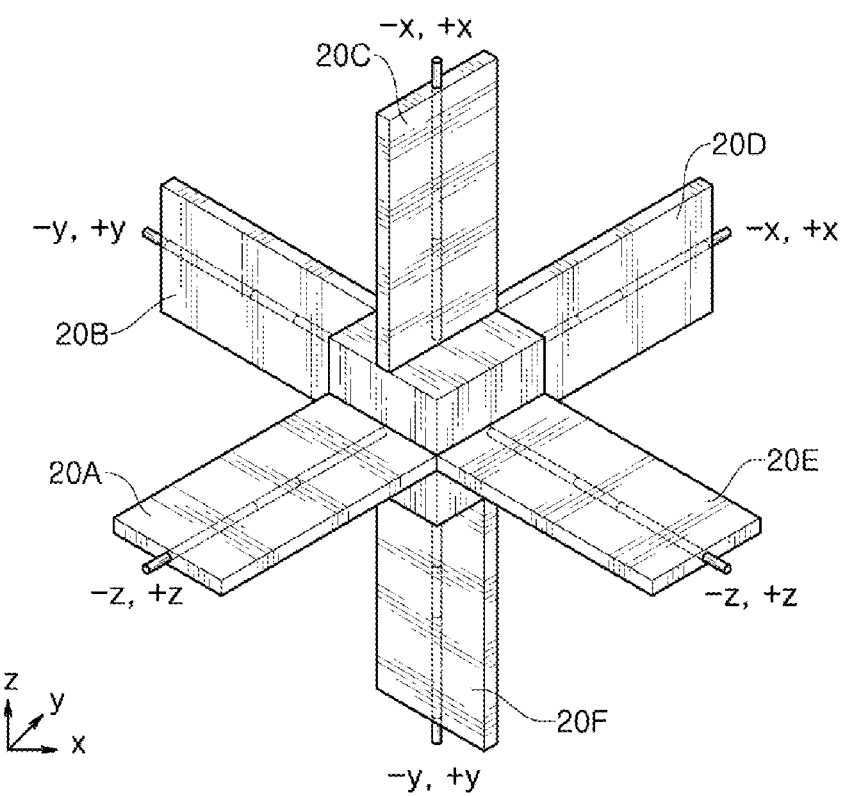
FIG. 5 is a conceptual view illustrating a 6-degrees of freedom (DOF) cantilever structure, according to an embodiment of the present application.

FIG. 5 is a conceptual view illustrating a 6-DOF cantilever structure, according to an embodiment of the present application.

In FIG. 5, ±signs and names of three axes (x-axis, y-axis, and z-axis) are merely examples, and it would be obvious to one of ordinary skill in the art that the cantilever 20 is bent in two directions or there are different 3D axes.

Referring to FIG. 5, the IMU sensor 100 may include six cantilevers 20 configured so that an extending axis of each cantilever 20 is parallel to any one of the three axes. The IMU sensor 100 may include three cantilever pairs having axes parallel to the x-axis, the y-axis, and the z-axis as extending axes. As shown in FIG. 5, the IMU sensor 100 may include: a first pair of cantilevers 20B, 20E extending in a direction parallel to the x-axis; a second pair of cantilevers 20A, 20D extending in a direction parallel to the y-axis; and a third pair of cantilevers 20C, 20F extending in a direction parallel to the z-axis. Such a pair of cantilevers 20 is coupled to the core body 30. The core body 30 includes six surfaces each parallel to any one of the three axes. The cantilevers of the pair extending in the same axis direction are spaced apart from each other around the core body 30.

The six cantilevers 20 are coupled to the core body 30 in a 6-degrees of freedom (6-DOF) structure for measuring 3-axis directions (orientations) and 3-axis positions. To this end, in the IMU sensor 100, two cantilevers 20 are coupled to the core body 30 to have surface directions parallel to one axis direction of the three axes, other two cantilevers 20 are coupled to the core body 30 to have surface directions parallel to another axis direction, and the remaining cantilevers 20 are coupled to the core body 30 to have surface directions parallel to the remaining axis direction. That is, two first cantilevers 20 from among the six cantilevers may be coupled to the core body 30 so that an axis parallel to the x-axis is a normal direction of the surface. Also, other two second cantilevers 20 from among the six cantilevers may be coupled to the core body 30 so that an axis parallel to the y-axis is a normal direction of the surface. Also, the remaining two third cantilevers 20 from among the six cantilevers may be coupled to the core body 30 so that an axis parallel to the z-axis is a normal direction of the surface.

For example, the six cantilevers 20 may be coupled to the core body 30 so that the cantilevers 20C, 20D have surface directions parallel to the x-axis, the cantilevers 20B, 20F have surface directions parallel to the y-axis, and the cantilevers 20A, 20E have surface directions parallel to the z-axis.

In this case, one cantilever 20 in a pair of cantilevers having the same extending axis has a bending axis different from that of the other cantilever 20. One cantilever 20 is configured to have a surface with a plane vector different from that of the other cantilever 20. Accordingly, in a pair of cantilevers 20 parallel to any one of the three axes and having the same extending axis, one cantilever 20 has a surface bent in a direction of any one of the three axes that is not parallel to its extending axis, and the other cantilever 20 has a surface bent in a direction that is not parallel to its extending axis and is different from the bending direction of the one cantilever 20.

For example, in the first pair of cantilevers 20B, 20E having an axis parallel to the x-axis as an extending axis, one cantilever 20E may have the y-axis as a bending axis and have a surface bent in a ±z direction and the other cantilever 20B may have the z-axis as a bending axis and have a surface bent in a ±y direction.

In the second pair of cantilevers 20A, 20D having an axis parallel to the y-axis as an extending axis, one cantilever 20D may have the z-axis as a bending axis and have a surface bent in a ±x direction, and the other cantilever 20A may have the x-axis as a bending axis and have a surface bent in the +z direction.

In the third pair of cantilevers 20C, 20F having an axis parallel to the z-axis as an extending axis, one cantilever 20C may have the y-axis as a bending axis and have a surface bent in the ±x direction, and the other cantilever 20F may have the x-axis as a bending axis and have a surface bent in the ±y direction.

A plurality of FBG sensors 10 are respectively located on the plurality of cantilevers 20.

In an embodiment, the plurality of FBG sensors 10 may include the FBG sensor located so that at least some of optical fibers are equally stretched or contracted for a plurality of cantilevers 20 simultaneously bent during rotation along the same bending axis.

For example, the cantilevers 20C, 20E have the y-axis as a bending axis, and when the IMU sensor 100 rotates about the bending axis (x-axis), the two cantilevers 20C, 20E are equally bent clockwise or counterclockwise. In this case, when the two cantilevers 20C, 20E rotate clockwise about the bending axis, all of optical fibers of the FBG sensors 10 located on the cantilevers 20C, 20E are contracted.

Also, in the plurality of FBG sensors 10 deformed in response to deformation of the plurality of cantilevers 20, some FBG sensors 10 may be stretched and other FBG sensors 10 may be contracted.

In an embodiment, in the IMU sensor 100, from among the FBG sensors 10 located on two cantilevers 20 having the same normal vector of the surface of the plurality of cantilevers 20, any one FBG sensor 10 may be located on a surface in a direction of a first axis of the normal vector of the surface, and the other FBG sensor 10 may be located on a surface in a direction of a second axis of the normal vector of the surface.

For example, surfaces of the cantilevers 20C, 20D all have the x-axis as a normal vector. The FBG sensor 10 located on the cantilever 20C is located on a surface in a negative x-axis direction, and the FBG sensor 10 located on the cantilever 20D is located on a surface in a positive x-axis direction. In this case, when the cantilevers 20C, 20D are simultaneously deformed, any one of the FBG sensors 10 of the cantilevers 20C, 20D may be stretched, and the other may be contracted.

Some or all of the remaining cantilevers 20A, 20B, 20E, 20F may be located in the same manner as the cantilevers 200, 20D, or may be located on a surface in the same direction of a normal vector of a surface. For example, as shown in FIG. 3, although the cantilevers 20A, 20E have the z-axis as a normal vector of a surface, the FBG sensors 10 may be located on a surface in a-z direction.

Bending deformation of the cantilever 20 may be detected by the FBG sensor 10 located on the cantilever 20. When a degree of deformation or the like of the cantilever 20 is detected, an external force applied to the cantilever 20 may be measured. This is because, due to a coupling structure of the cantilevers 20 of FIG. 5, the six strain sensors form three strain sensor pairs for measuring a linear acceleration of each of three axes or three strain sensor pairs for measuring an angular acceleration having a rotation axis of each of the three axes, and each of the six strain sensors is shared by a strain sensor pair for measuring a linear acceleration of any one of the three axes and a strain sensor pair for an angular acceleration having the same axis as a rotation axis.

Figure 6:
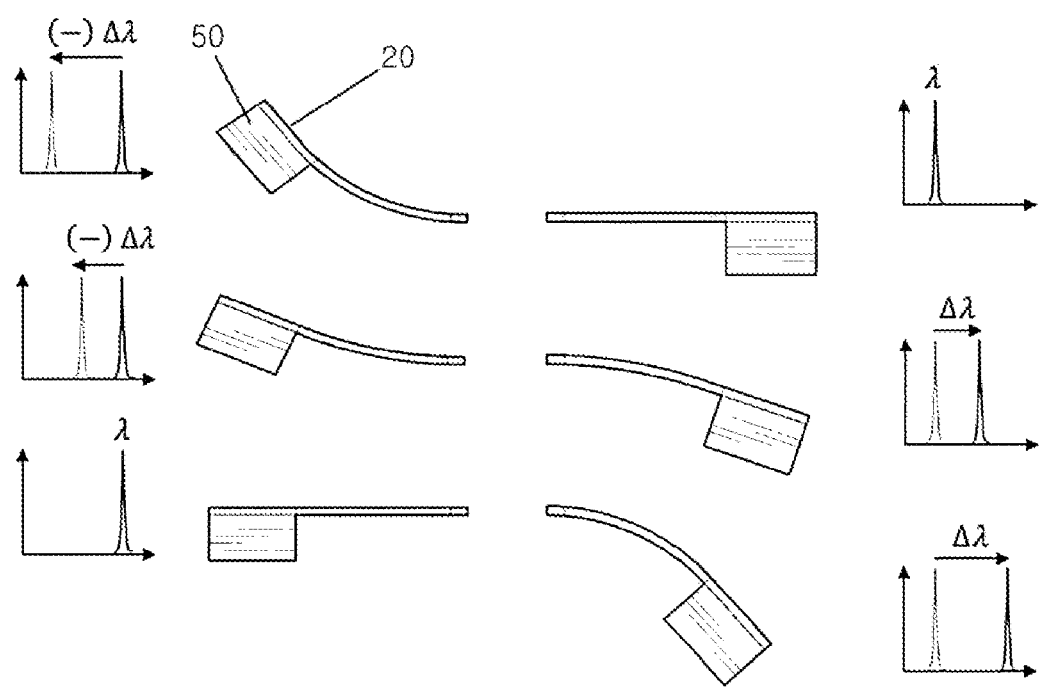
FIG. 6 is a view for describing a wavelength change of reflected light according to a degree of bending deformation of a cantilever, according to an embodiment of the present application.

FIG. 6 is a view for describing a wavelength change of reflected light according to bending deformation of a cantilever, according to an embodiment of the present application.

In FIG. 6, a wavelength spectrum of an embodiment in which one grating node 16 is located in one cantilever 20 is illustrated. For clarity of explanation, it is assumed that gravity is ignored.

When an external force is not applied to the cantilever 20, the cantilever 20 may be maintained in a basic state. The basic state is a state in which, for example, the cantilever 20 is maintained in a horizontal structure. When the cantilever 20 is not bent, a wavelength change of reflected light of the FBG sensor 10 does not occur.

For example, when an object to which the IMU sensor 100 move and an external force is applied to the cantilever 20, at least a part of the cantilever 20 may be bent. In this case, a wavelength change of reflected light may occur.

For example, when the cantilever 20 is bent downward toward a surface to which the mass body 50 is attached in FIG. 6, due to bending deformation of the cantilever 20, the grating interval Λ of the FBG sensor 10 is changed. As a result, a wavelength of reflected light is changed.

Alternatively, when the cantilever 20 is bent upward toward a side opposite to the surface to which the mass body 50 is attached in FIG. 6, due to bending deformation of the cantilever 20, the grating interval Λ of the FBG sensor 10 is changed. As a result, a wavelength of reflected light is changed.

As such, whether a wavelength of reflected light is changed indicates whether the cantilever 20 is deformed. As a result, whether a wavelength of reflected light is changed may be used to determine whether an external force that causes deformation of the cantilever 20 occurs.

Also, a deformation direction of the cantilever 20 may be determined according to a wavelength change direction of reflected light.

When the cantilever 20 is bent downward in FIG. 6, the grating interval Λ is reduced. In contrast, when the cantilever 20 is bent upward in FIG. 6, the grating interval Λ is increased. Because change directions of the grating interval Λ are opposite to each other, wavelength change directions are opposite to each other. For example, when the cantilever 20 is bent downward in FIG. 6, a wavelength change amount may have a negative value, and when the cantilever 20 is bent upward in FIG. 6, a wavelength change amount may have a positive value.

As such, when the IMU sensor 100 is used, information about whether an external force is applied to the IMU sensor 100, a strength of the external force, and/or a direction of the external force may be obtained.

For example, when a wavelength change amount of reflected light is applied to Equation 1, a physical change (e.g., a strain) for each of three axes may be calculated from an external force that causes deformation of the cantilever 20.

Also, the measurement device 300 may calculate a linear acceleration of the cantilever 20 based on the strain of the cantilever 20.

When the cantilever 20 is bent as shown in FIG. 6, a strain at the center of the cantilever 20 is 0 and a magnitude of a strain increases away from the center. Here, the term "strain" refers to a strain in a longitudinal direction of the cantilever 20.

When the FBG sensor 10 is located on an upper surface and deformation due to a gravitational acceleration occurs, the measurement device 300 may measure a strain in a (+) direction due to an expansion direction. In contrast, when the FBG sensor 10 is located on a lower surface and deformation occurs due to a gravitational acceleration, the measurement device 300 may measure a strain in a (−) direction due to a contraction direction.

When an acceleration higher than a gravitational acceleration occurs, a degree of bending deformation of the cantilever 20 is further increased, and thus, a change in a signal of the FBG sensor 10 is further increased. The measurement device 300 may calculate an acceleration value based on a degree of signal change of the FBG sensor 10.

An external acceleration applied to the cantilever 20 causes bending deformation of the cantilever 20. A peak value of a wavelength spectrum of the FBG sensor 10 is shifted due to bending deformation of the cantilever 20 with respect to a fixed axis (i.e., a coupling portion with the core body 30). In an embodiment, the measurement device 300 may pre-store a linear acceleration value corresponding to a strain obtained under the specification of the IMU sensor 10. The value may be determined by quantifying a change amount of a peak of the FBG sensor 10.

Also, the measurement device 300 may measure an angular acceleration of the cantilever 20 based on a strain of the cantilever 20. Because an angular acceleration is a tangential acceleration, the angular acceleration is measured in a manner similar to that of a linear acceleration. In this case, a centripetal acceleration compensation value should be applied. A process of calculating an angular acceleration from a linear acceleration is already known to one of ordinary skill in the art, and thus, a detailed description thereof will be omitted.

When bending deformation of the cantilever 20 is caused by a rotation of the object, a rotation direction is obtained as a measurement result.

In a 6-DOF structure, the FBG sensor 10 of the cantilever 20 is used to measure a strain in any one of three axes or a linear acceleration in the same direction. Here, the axis direction of a strain represents a bending direction. In FIG. 6, an FBG sensor 10D is used to measure a bending direction (i.e., a strain direction) of the x-axis. Also, the FBG sensor 10D is used to measure a linear acceleration of the object in the x-axis direction.

When the object moves in any of three-axis directions, two cantilevers 20 having surfaces against an external force in the movement axis direction are simultaneously bent. The surfaces of the two cantilevers 20 face the axis direction.

Three FBG sensor pairs are used to measure a linear acceleration of the object. Also, three FBG sensor pairs are used to measure an angular acceleration of the object. The three FBG sensor pairs for the linear acceleration and the three FBG sensor pairs for the angular acceleration are different from each other.

When an external force is applied to the IMU sensor 100, at least two cantilevers 20 from among the three cantilever pairs may be bent. The measurement device 300 may receive a wavelength spectrum set of the cantilevers 20, including wavelength spectra of the FBG sensors 10 of the at least two bent cantilevers 20. In this case, the measurement device 300 may calculate information about three-axis components of the external force that causes a wavelength change based on the wavelength spectrum set of the cantilevers 20.

Figure 7:
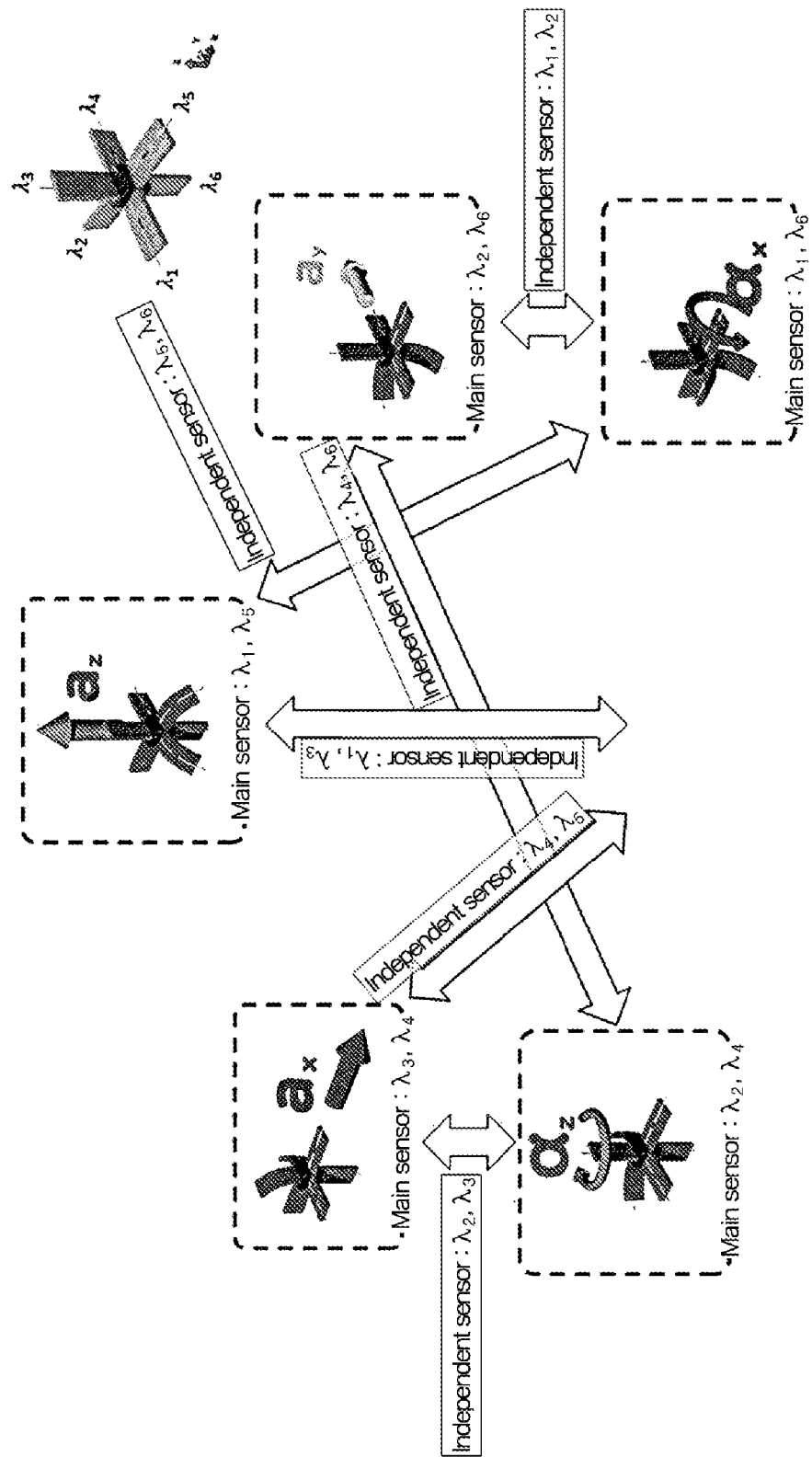
FIG. 7 is a view for describing a relationship between deformation of a cantilever and a linear acceleration/angular acceleration direction of an object in the structure of FIG. 6.

FIG. 7 is a view for describing a relationship between deformation of a cantilever and a linear acceleration/angular acceleration direction of an object in the structure of FIG. 6.

Referring to FIG. 7, main sensors mainly used to measure an x-axis linear acceleration of the object are FBG sensors 10C, 10D. Main sensors mainly used to measure a y-axis linear acceleration of the object are FBG sensors 10B, 10F. Main sensors mainly used to measure a z-axis linear acceleration of the object are FBG sensors 10A, 10E.

In contrast, main sensors mainly used to measure an angular acceleration of the object having the x-axis as a rotation axis are the FBG sensors 10A, 10F. Main sensors mainly used to measure an angular acceleration of the object having the y-axis as a rotation axis are the FBG sensors 10C, 10E. Main sensors mainly used to measure an angular acceleration of the object having the z-axis as a rotation axis are the FBG sensors 10B, 10D.

As such, three FBG sensor pairs for a linear acceleration are respectively used to measure linear accelerations in the x-axis, y-axis, and z-axis directions. Also, three FBG sensor pairs for an angular acceleration are respectively used to measure angular accelerations having the x-axis, the y-axis, and the z-axis as rotation axes.

From among two FBG sensors 10 of a cantilever pair mainly used to measure a linear acceleration in any one of three axes, any one FBG sensor 10 is mainly used to measure an angular acceleration having another axis of the three axes as a rotation axis, and the other FBG sensor 10 is mainly used to measure an angular acceleration having the remaining axis of the three axes as a rotation axis.

For example, from among the main sensors 10C, 10D used to measure the x-axis linear acceleration, any one (e.g., the main sensor 10C) is used to measure an angular acceleration having the y-axis as a rotation axis and the other (e.g., the main sensor 10D) is used to measure an angular acceleration having the z-axis that is the remaining axis as a rotation axis.

An FBG sensor pair for a linear acceleration and an FBG sensor pair for an angular acceleration may share the same FBG sensor. A sensor that is shared is referred to as a dependent sensor, and a sensor that is not shared is referred to as an independent sensor. A dependent sensor for a specific axis is used to measure a strain in a specific axis direction, or measure an angular acceleration having the same specific axis as a rotation axis.

For example, in the pair of FBG sensors 10C, 10D for the x-axis linear acceleration and the pair of FBG sensors 10B, 10D for the angular acceleration of the z rotation axis, a dependent sensor is the FBG sensor 10D and independent sensors are sensors other than the dependent sensor, that is, the FBG sensors 10B, 10C.

As such, the IMU sensor 100 includes at least one FBG sensor 10 that is independently used in measuring a linear acceleration of the object for a specific axis and an angular acceleration of the object having the specific axis as a rotation axis. The measurement device 300 identifies the linear acceleration and the angular acceleration of the object by using data of the at least one independent FBG sensor 10.

When a data value of a dependent sensor is 0, the measurement device 300 integrates values of dependent and independent sensors and measures an angular acceleration and/or a rotation angle. When there is a data value of a dependent sensor, the measurement device 300 determines that a linear acceleration occurs. The measurement device 300 integrates only data values of independent sensors and measures an angular acceleration and/or a rotation angle.

Figure 8:
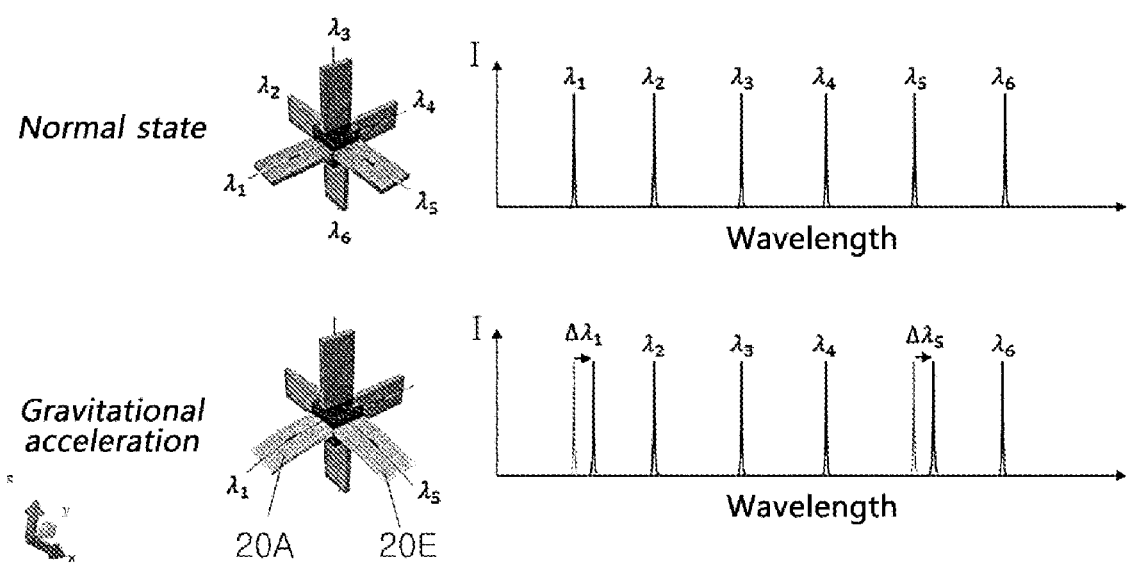
FIG. 8 is a view illustrating a wavelength spectrum set of an IMU sensor 100 to which only gravity is applied, according to an embodiment of the present application.
Figure 9A:
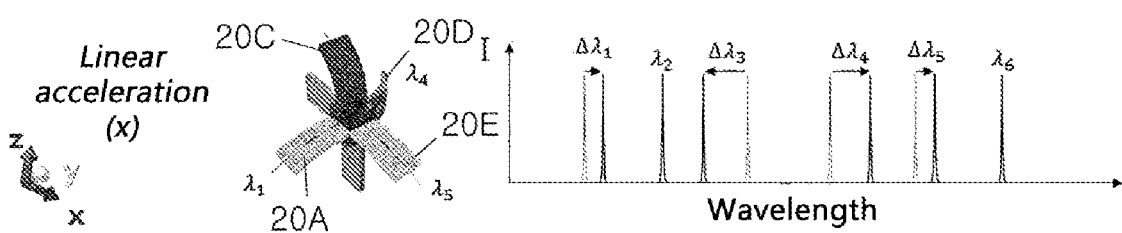
FIGS. 9A to 9C are views illustrating a wavelength spectrum set according to a movement direction of the IMU sensor 100, according to an embodiment of the present application.
Figure 9B:
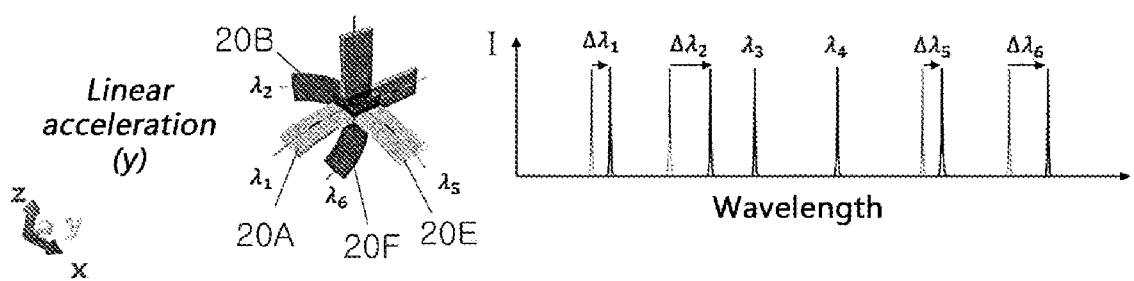
Figure 9C:
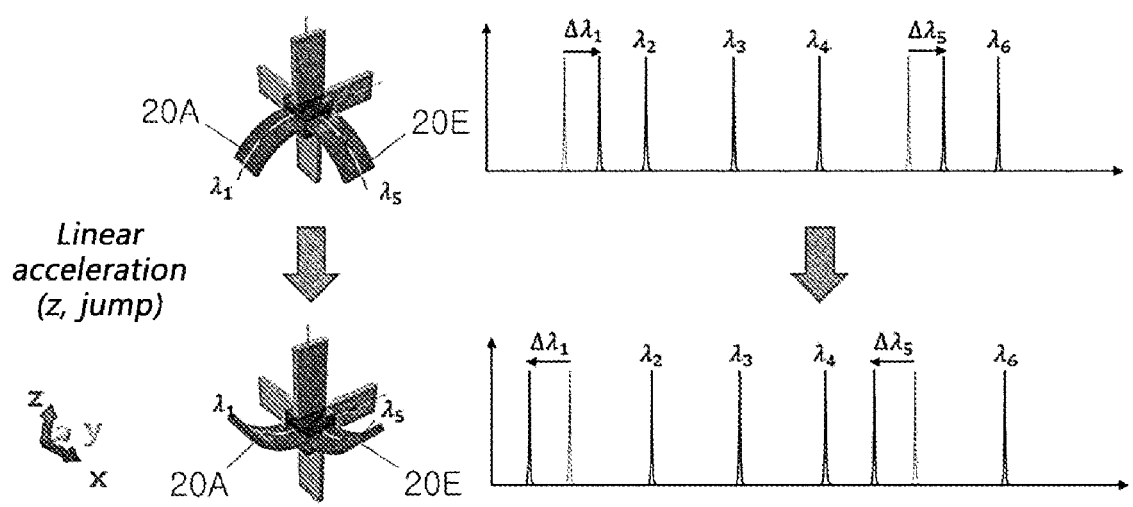

FIG. 8 is a view illustrating a wavelength spectrum set of the IMU sensor 100 to which only gravity is applied, according to an embodiment of the present application. FIGS. 9A to 9C are views illustrating a wavelength spectrum set according to a movement direction of the IMU sensor 100, according to an embodiment of the present application.

In FIGS. 8, and 9A to 9C, $\lambda_1, \lambda_2, \lambda_3, \lambda_4, \lambda_5, \lambda_6$ respectively represent wavelength spectra corresponding to the sensors 10A, 10B, 10C, 10D, 10E, 10F provided on the cantilevers 20A, 20B, 20C, 20D, 20E, 20F. The wavelengths $\lambda_1, \lambda_2, \lambda_3, \lambda_4, \lambda_5, \lambda_6$ illustrated in the wavelength spectra of FIGS. 8, and 9A to 9C correspond to values obtained by applying intervals $\Lambda_1, \Lambda_2, \Lambda_3, \Lambda_4, \Lambda_5, \Lambda_6$ of gratings of grating nodes located in the cantilevers to Equation 1. In other words, the wavelengths $\lambda_1, \lambda_2, \lambda_3, \lambda_4, \lambda_5, \lambda_6$ respectively represent wavelengths of reflected light reflected and output by the grating nodes. In FIGS. 8, and 9A to 9C, it is assumed that there is no change in a wavelength due to a temperature.

When all external forces including a movement and/or gravity do not deform the cantilevers 20, all of multiple wavelength spectra included in the wavelength spectrum set of the IMU sensor 100 may not be changed. However, the IMU sensor 100 has a state in which an external force due to a movement of an object is applied under the influence of Earth' gravity, or no external force due to a movement of the object is applied.

A wavelength spectrum changed when only gravity is applied to the cantilever 20 and the object is at rest (e.g., the object is in a resting state) includes a wavelength spectrum corresponding to the cantilever 20 having an axis parallel to a gravity direction, for example, the z-axis, as a normal vector of a surface. In the resting state of the object, the cantilever 20 having a surface facing a gravity direction in a wavelength spectrum set is deformed. For example, as shown in FIG. 8, the cantilever 20E and the cantilever 20A are bent in the gravity direction. In this case, the wavelength spectra $\lambda_1, \lambda_5$ corresponding to the cantilevers 20A, 20E are changed. Because changes in grating intervals according to bending deformation of the cantilevers 20A, 230E are increased and bending directions are the same, wavelength change signs are also the same. A wavelength change sign may vary according to an arrangement of the FBG sensor 10.

A wavelength spectrum changed when the object moves in a positive x-axis direction includes a wavelength spectrum corresponding to the cantilever 20 having an axis parallel to a movement direction (the x-axis of FIG. 9A) as a normal vector of a surface. When the object walks in the positive x-axis direction, the cantilever 20 having a surface facing a direction in which the object walks is deformed. For example, as shown in FIG. 9A, the cantilevers 20C, 20D are deformed. In this case, the wavelength spectra $\lambda_3$, $\lambda_4$ corresponding to the cantilevers 20C, 20D are changed. As shown in FIG. 9A, when optical fibers are provided on surfaces of the cantilevers 20C, 20D, wavelength change signs are opposite to each other. This is because the grating interval $\Lambda_5$ is reduced due to bending deformation of the cantilever 20C and the grating interval $\Lambda_4$ is increased due to bending deformation of the cantilever 20D. Although the cantilevers 20A, 20E may be deformed by a gravitational acceleration, the cantilevers 20A, 20E may be less deformed or more deformed than the cantilevers 20C, 20D.

A wavelength spectrum changed when the object moves in a positive y-axis direction includes a wavelength spectrum corresponding to the cantilever 20 having an axis parallel to a movement direction (the y-axis of FIG. 9B) as a normal vector of a surface. When the object walks in the positive y-axis direction, the cantilever 20 having a surface facing a direction in which the object walks is deformed. For example, as shown In FIG. 9B, the cantilevers 20B, 20F are deformed. In this case, the wavelength spectra $\Lambda_2$, $\lambda_6$ corresponding to the cantilevers 20B, 20F are changed. Because both the grating intervals $\Lambda_2$, $\Lambda_6$ are increased due to bending deformation of the cantilevers 20B, 20F, wavelength change signs are the same.

A wavelength spectrum changed when the object moves in a negative z-axis direction includes a wavelength spectrum corresponding to the cantilever 20 having an axis parallel to a movement direction (the z-axis of FIG. 9C) as a normal vector of a surface. When the object moves in the negative z-axis direction (e.g., falls down), the cantilever 20 having a surface facing a direction in which the object moves is deformed. For example, as shown in FIG. 9C, the cantilevers 20A, 20E are deformed. In this case, the wavelength spectra $\lambda_1$, $\lambda_5$ corresponding to the cantilevers 20A, 20E are changed. Because both the grating intervals $\Lambda_1$, As are increased due to bending deformation of the cantilevers 20A, 20E, wavelength change signals are the same. A change amount of the wavelength spectra $\lambda_1$, $\lambda_5$ includes a change amount due to gravity (e.g., a change amount of FIG. 8).

Also, the measurement device 300 may calculate an angular acceleration based on the wavelength spectrum set.

Figure 10:
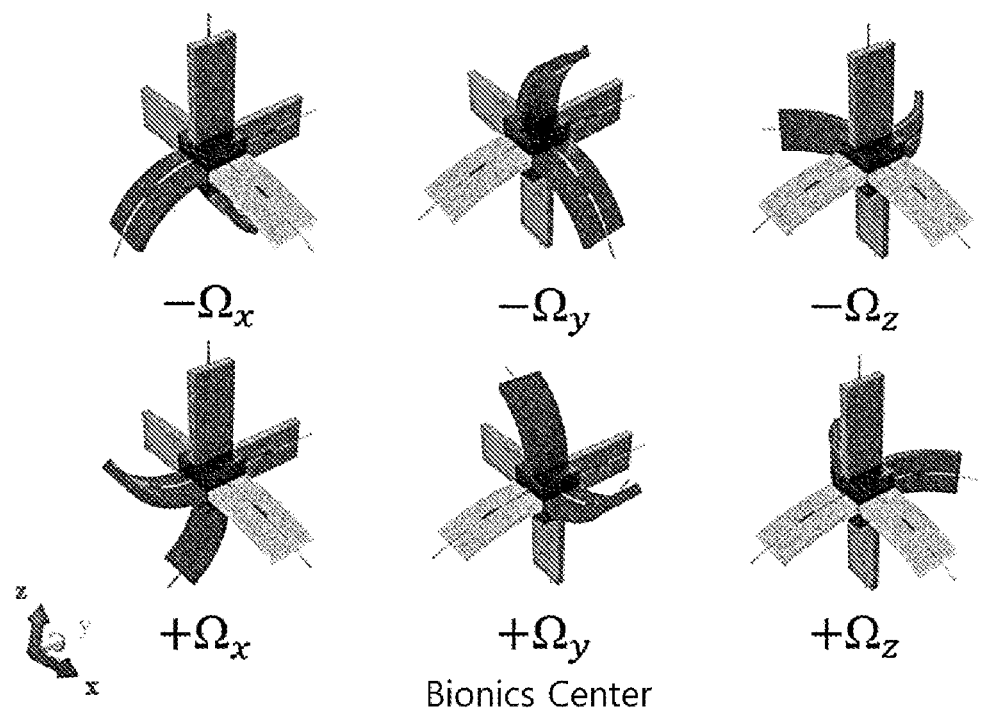
FIG. 10 is a view illustrating a deformation behavior of each cantilever during rotation of the IMU sensor 100, according to an embodiment of the present application.
Figure 11A:
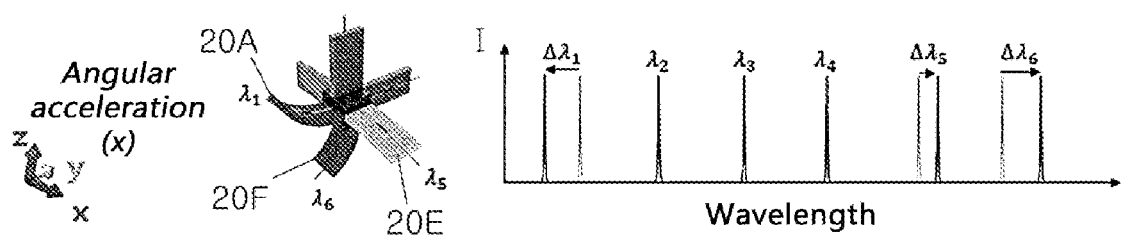
FIGS. 11A to 11C are views illustrating a wavelength spectrum change according to a rotation direction of the IMU sensor 100, according to an embodiment of the present application.
Figure 11B:
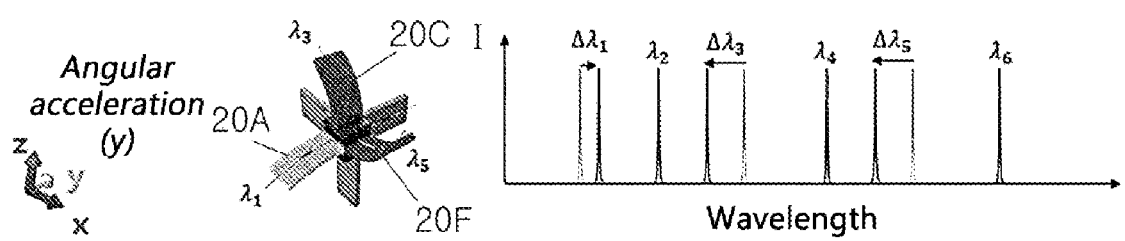
Figure 11C:
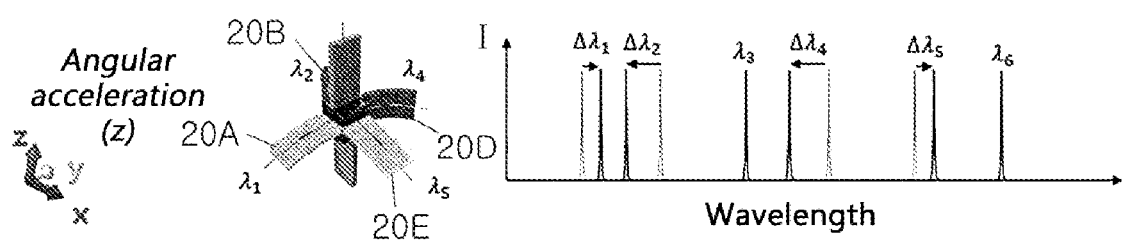

FIG. 10 is a view illustrating rotation states of the IMU sensor 100, according to an embodiment of the present application. FIGS. 11A to 11C are views illustrating a wavelength spectrum change according to a rotation direction of the IMU sensor 100, according to an embodiment of the present application. A spectrum set including six wavelength spectra is obtained from six FBG sensors 10.

In FIG. 10, +Ω denotes a counterclockwise rotation with respect to a rotation axis. The cantilevers 20 extend along three axes, and a surface of each cantilever 20 has any one of the three axes as a normal vector. Accordingly, as shown in FIG. 10, the IMU sensor 100 may have six rotation states.

When the IMU sensor 100 rotates about any one of the three axes as shown in FIGS. 10 and 11A to 10C, at least two cantilevers may be bent.

The cantilever 20 deformed when the IMU sensor 100 rotates about the x-axis may include the cantilever 20 having the x-axis as a bending axis. For example, as shown in FIG. 11A, the cantilever 20 deformed when the IMU sensor 100 rotates about the x-axis may include the cantilevers 20A, 20F that are bent in a direction perpendicular to the x-axis. In this case, the wavelength spectra $\lambda_1$, $\lambda_6$ corresponding to the cantilevers 20A, 20F are changed. Because the grating interval $\Lambda_1$ is reduced due to bending deformation of the cantilever 20A and the grating interval $\Lambda_6$ is increased due to bending deformation of the cantilever 20F, wavelength change signs are opposite to each other. Although the cantilever 20E may be deformed by a gravitational acceleration, the cantilever 20E may be less deformed than the cantilevers 20A, 20F according to an angular acceleration.

The cantilever 20 deformed when the IMU sensor 100 rotates about the y-axis may include the cantilever 20 having the y-axis as a bending axis. For example, as shown in FIG. 11B, the cantilever 20 deformed when the IMU sensor 100 rotates about the y-axis may include the cantilevers 20C, 20F that are bent in a direction perpendicular to the y-axis. In this case, the wavelength spectra $\lambda_3$, $\lambda_6$ corresponding to the cantilevers 20C, 20F are changed. Because the grating interval $\Lambda_6$ is reduced due to bending deformation of the cantilever 20F and the grating interval $\Lambda_3$ is increased due to bending deformation of the cantilever 20C, wavelength change signs are opposite to each other. A change amount of the wavelength spectrum $\lambda$ includes a change amount due to gravity. Although the cantilever 20A may be deformed by gravity, the cantilever 20A may be less deformed than the cantilevers 20C, 20F according to an angular acceleration.

The cantilever 20 deformed when the IMU sensor 100 rotates about the z-axis may include the cantilever 20 having the z-axis as a bending axis. For example, as shown in FIG. 11C, the cantilever 20 deformed when the IMU sensor 100 rotates about the z-axis may include the cantilevers 20B, 20D that are bent in a direction perpendicular to the z-axis. In this case, the wavelength spectra $\Lambda_2$, $\lambda_4$ corresponding to the cantilevers 20B, 20D are changed. The grating intervals $\Lambda_2$, $\lambda_4$ are reduced due to bending deformation of the cantilevers 20B, 20D, and wavelength change signals are the same. Although the cantilevers 20A, 20E may be deformed by gravity, the cantilevers 20A, 20E may be less deformed than the cantilevers 20B, 20D according to an angular acceleration.

The measurement device 300 may calculate directions and/or magnitudes of an angular acceleration and a linear acceleration based on a direction and/or a change amount of a wavelength spectrum for each FBG sensor 10, included in such a wavelength spectrum set.

In an embodiment, the measurement device 300 may calculate a change amount for measuring an actual linear acceleration and/or angular acceleration by subtracting a change amount due to gravity from a change amount detected for the cantilever 20 that is bent by gravity. This is because when directions of a linear acceleration and an angular acceleration are parallel to a gravity direction, a detected change amount includes a change amount due to gravity. In this case, a result of additional deformation due to gravity is corrected.

To this end, as shown in FIG. 8, the measurement device 300 may pre-calculate a change amount of a wavelength spectrum detected in a situation where only gravity is applied as a gravity correction value. Also, the measurement device 300 may pre-store the pre-calculated gravity correction value.

When there is no change amount of a wavelength in a correction result for gravity, it may be determined that bending deformation does not occur. After gravity correction is performed by using a change amount due to gravity, the measurement device 300 may select the cantilever 20 having deformation in response to a movement of an object. For example, when four wavelength spectra are changed as shown at the bottom of FIG. 6B, the cantilevers 20B, 20F corresponding to the wavelengths spectra $\lambda_2$, $\lambda_6$ may be selected as the cantilever 20 having deformation in response to the movement of the object.

Also, the measurement device 300 may determine a cantilever that is formed due to a movement of the object by detecting a change in a wavelength spectrum of reflected light included in a wavelength spectrum set received from the IMU sensor 100, may determine a deformation direction of the cantilever based on a change sign of the wavelength spectrum for each FBG sensor 10, and may determine a direction of a linear acceleration based on the deformation direction. That is, the measurement device 300 may determine a direction of a linear acceleration of the object based on a wavelength spectrum corresponding to the cantilever 20 that is deformed in response to the movement of the object and is selected.

The measurement device 300 may determine a direction of a linear acceleration of an object as shown in Table 1.

TABLE 1

| | Normal state | +x axis direction movement | −x axis direction movement | +y axis direction movement | −y axis direction movement | Z axis direction movement (jump) |
|---|---|---|---|---|---|---|
| Cantilever (20A) | | | | | | −z -> +z |
| Cantilever (20B) | | | | +y | −y | |
| Cantilever (20C) | | −x | −x | | | |
| Cantilever (20D) | | −x | −x | | | |
| Cantilever (20E) | | | | | | −z -> +z |
| Cantilever (20F) | | | | +y | −y | |

Also, when there are at least two deformed cantilevers and deformation directions of the at least two deformed cantilevers include different axis directions, the measurement device 300 may determine a rotation direction based on the deformation directions of the at least two deformed cantilevers. For example, the measurement device 300 may determine a direction of an angular acceleration of an object as shown in Table 2.

TABLE 2

| | +Ωx | +Ωy | +Ωz | −Ωx | −Ωy | −Ωz |
|---|---|---|---|---|---|---|
| Cantilever (20A) | +z | | | | | |
| Cantilever (20B) | | | +y | | | −y |
| Cantilever (20C) | | −x | | | +x | |
| Cantilever (20D) | | | +x | | | −x |
| Cantilever (20E) | | +z | | | | |
| Cantilever (20F) | −y | | +y | | | |

When it is determined that the cantilever 20A is bent in a +z direction and the cantilever 20F is bent in a -y direction as shown in Table 2 as an analysis result of a wavelength spectrum set, the measurement device 300 may determine that the IMU sensor 100 makes a rotation of +Ωx. Alternatively, in a rotation of −Ωx, the measurement device 300 may determine a rotation direction based on that the cantilever 20A is bent in a-z direction and the cantilever 20F is bent in a ±y direction. Signs in Table 2 are merely examples, and a deformation direction of the cantilever 20 used by the measurement device 300 to determine a rotation direction (or an angular acceleration direction) is set depending on whether the FBG sensor 10 is located on a front surface or a rear surface of the cantilever 20. For example, when the FBG sensor 10 is located on the opposite surface in FIGS. 5 to 11C, signs of Table 2 may be set in reverse.

Also, the measurement device 300 may calculate an angular acceleration based on a calculated linear acceleration and rotation direction. The measurement device 300 calculates rotation information of a specific direction by using strains of a plurality of cantilevers 20 deformed during rotation of the specific direction.

For example, the measurement device 300 may integrate linear accelerations occurring in the cantilevers 20B, 20D corresponding to a rotation of +Ωz to obtain rotation information of a yaw direction, and may calculate rotation change information of the yaw direction. Linear accelerations of the cantilevers 20B, 20D are calculated by strains of the cantilevers 20B, 20D.

In addition, the measurement device 300 may integrate linear accelerations occurring in the cantilevers 20A, 20E corresponding to a rotation of +Ωx to obtain rotation information of a pitch direction, and may calculate rotation change information of the pitch direction. Also, this is the same in obtaining rotation information of a roll.

In addition, the inertial measurement system 1 may be further configured to perform a temperature correction operation of removing the influence of a temperature. To this end, the IMU sensor 100 includes a temperature sensor for temperature correction. In an embodiment, the temperature sensor may be the FBG sensor 10. As the temperature sensor, the FBG sensor 10 includes a temperature correction grating node. In specific embodiments, at least one of six FBG sensors 10 of FIG. 6 may further include the temperature correction grating node. In this case, the FBG sensor 10 includes the grating node 16 for deformation of the cantilever 20 and the temperature correction grating node.

When a Bragg wavelength is totally differentiated under a Bragg condition, and then an equation of a temperature, a strain, a grating interval, and an effective refractive index is applied, it is summarized as shown in Equation 2.

$$\Delta \lambda_B = \lambda_B[(\alpha_f + \xi_f)\Delta T + (1P_e)\varepsilon] \quad \text{[Equation 2]}$$

Here, $\alpha_f$ denotes a thermal expansion coefficient of an optical fiber, and $\xi_f$ denotes a thermos-optic coefficient representing a change in a refractive index of the optical fiber due to a temperature. Pe is a photoelastic constant and generally has a value of 0.22.

A change in a wavelength $\lambda_B$ of reflected light output from the light inlet 14 of the FBG sensor 10 depends on a strain and/or a temperature of the optical fiber of the FBG sensor 10. Accordingly, in order to calculate an accurate strain, a change in a wavelength $\lambda$ due to a temperature should be corrected.

Figure 12:
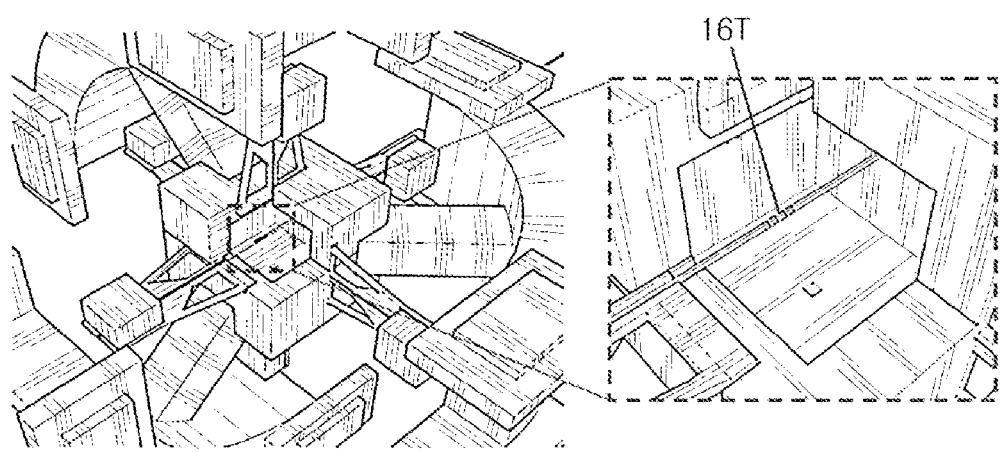
FIG. 12 is a perspective view illustrating the IMU sensor 100 including a temperature correction grating node, according to an embodiment of the present application.

FIG. 12 is a perspective view illustrating the IMU sensor 100 including a temperature correction grating node, according to an embodiment of the present application.

Referring to FIG. 12, at least one of a plurality of FBG sensors 10 included in the IMU sensor 100 may include a temperature correction grating node 16T. The temperature correction grating node 16T is used to detect a wavelength change amount according to a temperature.

The at least one FBG sensor 10 including the temperature correction grating node 16T is located so that the grating interval Λ is not changed by a movement of an object.

In an embodiment, the temperature correction grating node 16T may be located in an optical fiber portion extending from a portion where the cantilever 20 and the core body 30 are coupled to each other, inside the core body 30. A position where the temperature correction grating node 16T is provided is a position where an interval change between gratings due to a temperature change is greater than an interval change between gratings due to deformation of a cantilever caused by a movement of an object to which the IMU sensor is attached. In the optical fiber portion where the temperature correction grating node 16T is located, expansion/contraction due to bending deformation of the cantilever 20 relatively hardly occurs, or only expansion/contraction due to a temperature occurs. In this case, in a change in a wavelength spectrum of reflected light which is measured, a change in a wavelength spectrum of reflected light caused by an interval change between gratings due to deformation of a cantilever is relatively ignored. The change in the wavelength spectrum of reflected light which is measured may be considered almost identical to a change in a wavelength spectrum of reflected light caused by an interval change between gratings due to a temperature change.

In another embodiment, the temperature correction grating node 16T is attached to an arbitrary point outside the core body 30. The arbitrary point is a point that is not affected by bending deformation of the cantilever 20. The temperature correction grating node 16T attached to the point outside the core body 30 may be used to detect a temperature without being affected by a strain.

The measurement device 300 may receive a wavelength spectrum corresponding to the temperature correction grating node 16T. The measurement device 300 connected to the IMU sensor 100 of FIG. 2 may receive a wavelength spectrum set including six wavelength spectra and a wavelength spectrum corresponding to the temperature correction grating node 16T. The measurement device 300 may calculate a temperature correction value by using a change amount of the wavelength spectrum corresponding to the temperature correction grating node 16T. The measurement device 300 may apply the temperature correction value to a change amount of a wavelength spectrum corresponding to the cantilever 20, may remove a change amount due to a temperature included in the change amount of the wavelength spectrum corresponding to the cantilever 20, and may detect only a change amount due to a strain. The measurement device 300 may more accurately measure information about a linear acceleration and/or an angular acceleration based on the change amount due to the strain, without the change amount due to the temperature.

In addition, a sensitivity of the IMU sensor 100 may be improved according to a planar design of the cantilever 20. The IMU sensor 100 with a higher sensitivity has a larger change in the grating interval Λ than the IMU sensor 100 with a lower sensitivity, despite the same deformation of the cantilever 20.

In specific embodiments, in the IMU sensor 100, at least one cantilever 20 may have a surface shape of the cantilever 20 with a higher sensitivity.

Figure 13:
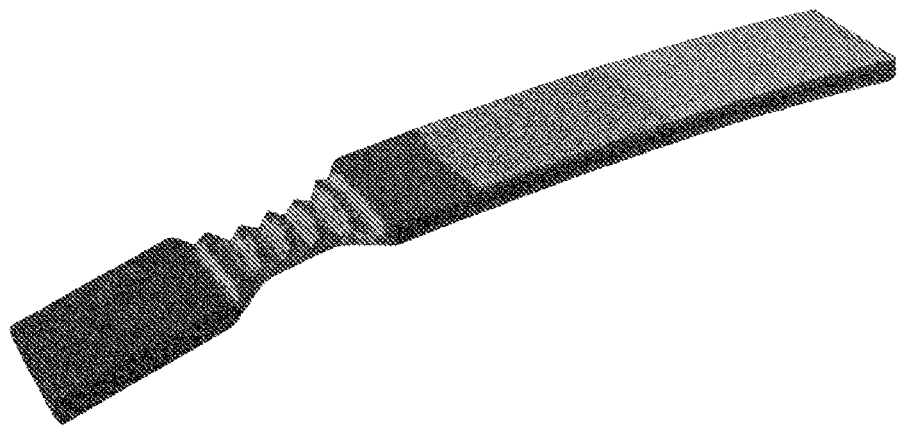
FIG. 13 is a perspective view illustrating a cantilever of a slim plane, according to an embodiment of the present application.

FIG. 13 is a perspective view illustrating a cantilever of a slim plane, according to an embodiment of the present application.

Referring to FIG. 13, at least one of a plurality of cantilevers (e.g., six cantilevers) of the IMU sensor 100 may include the cantilever 20 formed in a planar shape of a slim structure. The slim structure refers to a structure in which a portion of the cantilever 20 has a smaller width than another portion. The smaller width portion is referred to as a slim area.

When the grating node 16 for detecting deformation of the cantilever 20 of the FBG sensor 10 is located in the slim area, even when the same load is applied, a higher strain may be induced, compared to a case where the grating node 16 is located in the cantilever 20 of a non-slim plane. The non-slim plane is a plane not including a slim area, and includes a plane in which a width from a side surface to the other side surface of the cantilever 20 is kept constant. As a higher strain is obtained, a sensitivity of the IMU sensor 100 increases.

In an embodiment, the cantilever 20 may be configured so that a width of one side surface where the cantilever 20 is not coupled to the core body 30 is less than a width of the other side surface where the cantilever 20 is coupled to the core body 30. In some embodiments, as shown in FIG. 4, the cantilever 20 may be formed at a specific angle from the other side to one point between the one side and the other side, and may have a parallel plane from the one point to the one side.

Even when the same load is applied and the cantilever 20 is bent in the same deformed state, a change in the grating interval Λ of the slim cantilever 20 is larger, resulting in a higher strain with a slim structure. As a result, the IMU sensor 100 having the slim cantilever 20 has a higher sensitivity than the IMU sensor 100 not including the slim cantilever 20. A slim structure of the slim cantilever 20 may have any of various structures such as a quadrangular structure, a trapezoidal structure, a circular structure, or a taper structure. Also, a sensitivity of the FBG sensor 10 may be adjusted by changing a parameter of the structure.

Figure 14A:
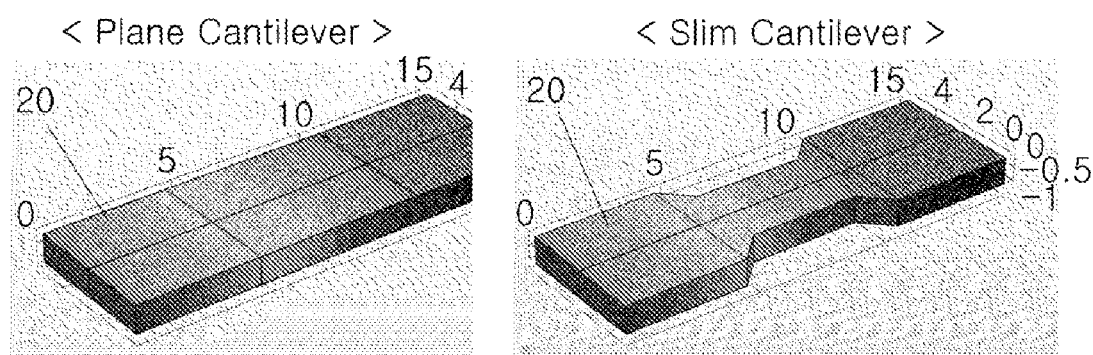
FIGS. 14A and 14B are views for describing sensitivities of a plane cantilever and a slim cantilever, according to an embodiment of the present application.
Figure 14B:
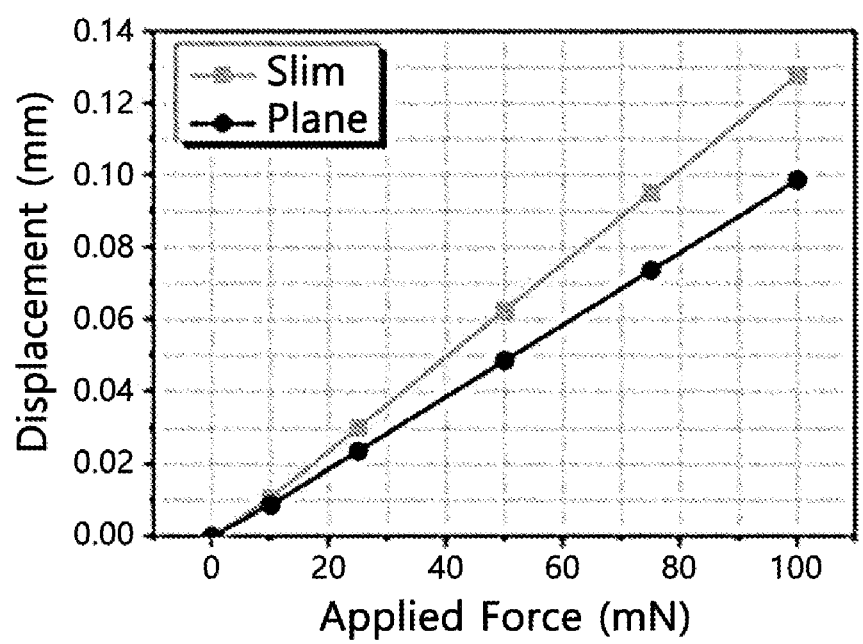

FIGS. 14A and 14B are views for describing sensitivities of a plane cantilever and a slim cantilever, according to an embodiment of the present application.

When the plane cantilever 20 and the slim cantilever 20 of FIG. 14A have the same degree of deformation with the same force, an interval change of the grating node 16 is illustrated in FIG. 14B. In FIG. 14A, the grating node 16 is located in a slim area.

As shown in FIG. 14B, a larger interval change occurs in the slim cantilever 20. Accordingly, an IMU sensor having a higher sensitivity may be manufactured by using the slim cantilever 20.

The slim area of the slim cantilever 20 may have any of various planar shapes.

FIGS. 15A to 15D are plan views illustrating a slim area of a slim cantilever, according to various embodiments of the present application.

Figure 15A:
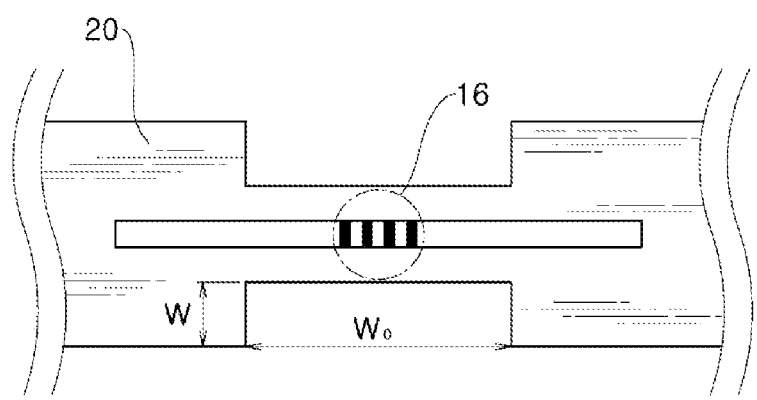
FIGS. 15A to 15D are plan views illustrating a slim area of a slim cantilever, according to various embodiments of the present application.

As shown in FIG. 15A, a slim area may have a groove width W from an outer side surface and a groove length L0. The slim area may have a rectangular shape or a square shape.

Figure 15B:
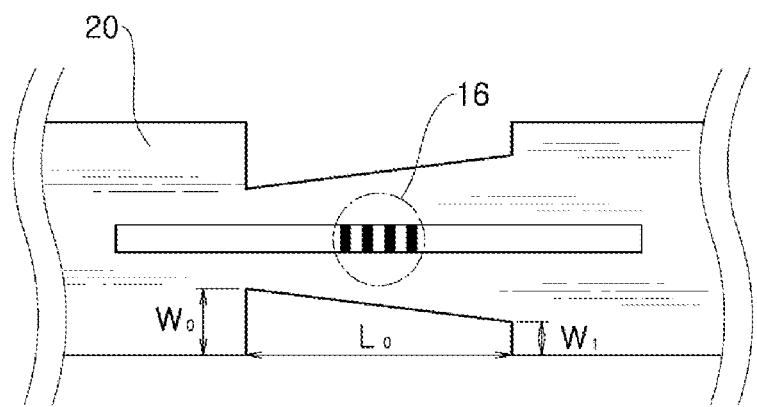

As shown in FIG. 15B, in a slim area, a first width length W0 and a second width length W1 may be different from each other. The slim area may have a trapezoidal shape.

Figure 15C:
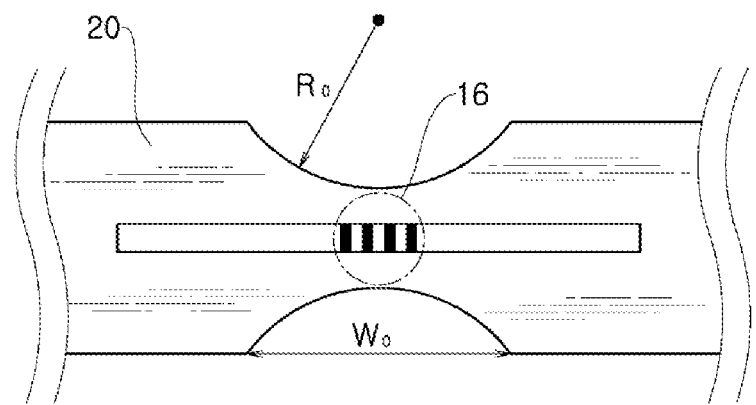

As shown in FIG. 15C, a slim area may have a semicircular shape with a radius Ro.

Figure 15D:
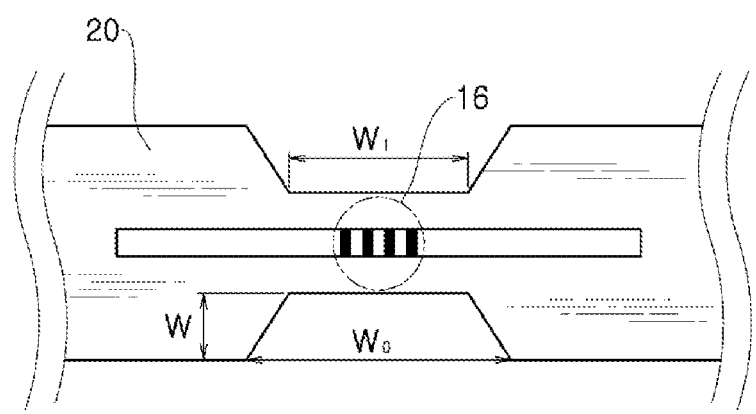

As shown in FIG. 15D, in a slim area, a length L0 of an outer groove and a length L1 of an inner groove may be different from each other. The slim area may have a trapezoidal shape.

Figure 16:
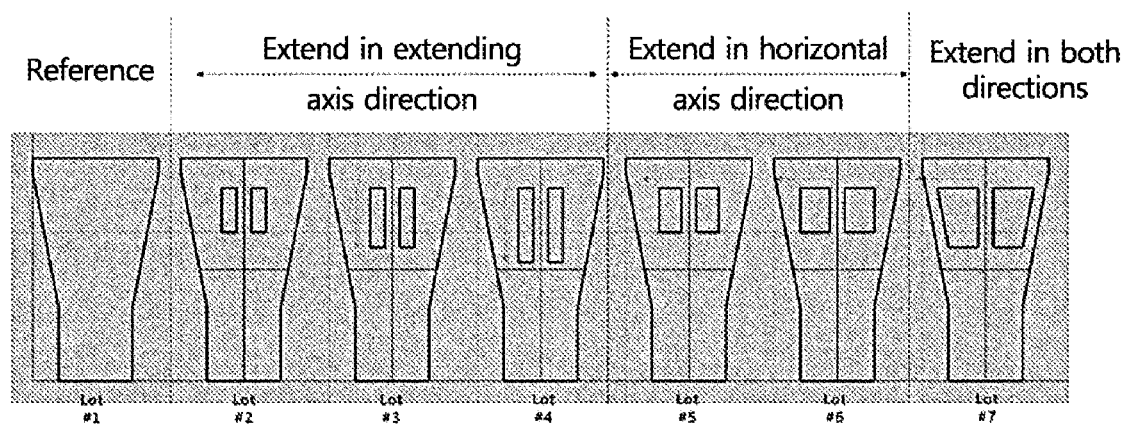
FIG. 16 is a view illustrating designs of a plurality of through-holes according to an area and a cross-sectional shape of a through-hole, according to various embodiments of the present application.

FIG. 16 is a view illustrating designs of a plurality of through-holes according to an area and a cross-sectional shape of a through-hole, according to various embodiments of the present application.

Referring to FIG. 16, the cantilever 20 may have a layer structure not including a through-hole. Alternatively, the cantilever 20 may have a through-hole of any of various shapes such as a quadrangular shape, a trapezoidal shape, or a fan shape according to a size and/or a shape of the cantilever 20. The through-hole may extend in an extending axis direction of the cantilever 20 and/or a direction perpendicular to the extending axis. Cross-sections of two through-holes formed with the grating node 16 therebetween may be symmetrical to each other.

FIGS. 17A to 17D are views illustrating designs of through-holes, according to various embodiments of the present application.

Figure 17A:
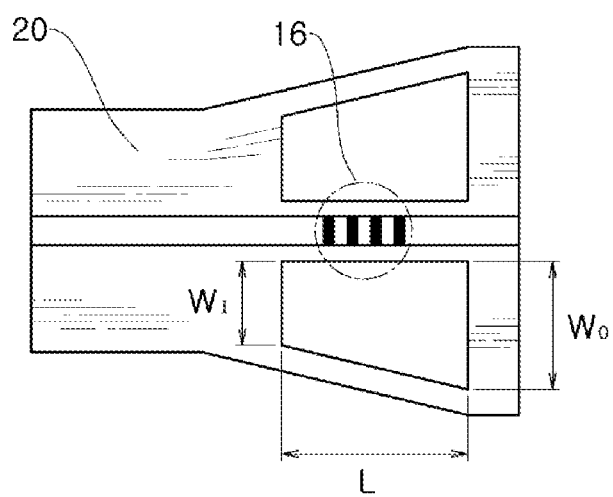
FIGS. 17A to 17D are views illustrating designs of through-holes, according to various embodiments of the present application.

As shown in FIG. 17A, a width W1 of one side surface of a through-hole and a width W0 of the other side surface may be different from each other. Also, lengths L of two through-holes formed with the grating node 16 therebetween may be the same.

Figure 17B:
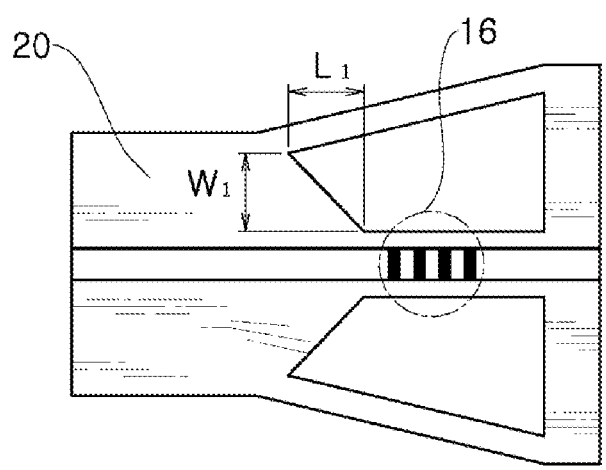

As shown in FIG. 17B, a length of an inner side surface of a through-hole may be less than a length of an outer side surface.

Figure 17C:
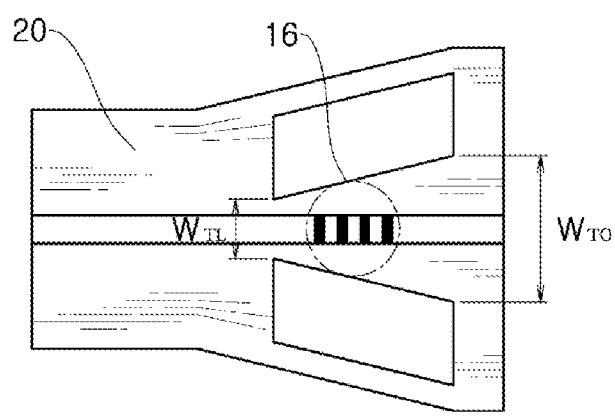

As shown in FIG. 17C, an interval $W_{TL}$ between one side surfaces and an interval $W_{TO}$ between the other side surfaces of two through-holes formed with the grating node 16 therebetween may be different from each other.

Figure 17D:
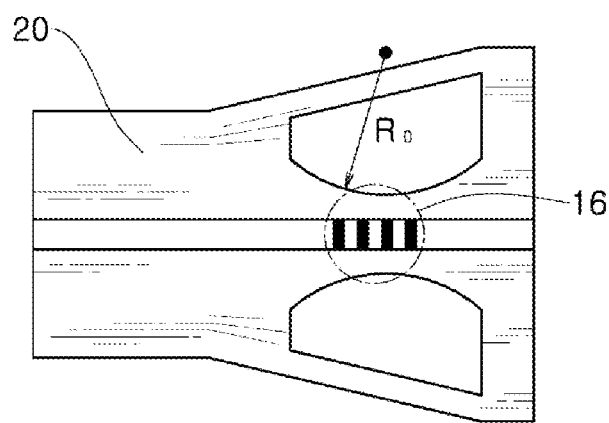

As shown in FIG. 17D, one inner side surface of a through-hole may have a curved shape with a radius Ro.

Figure 18:
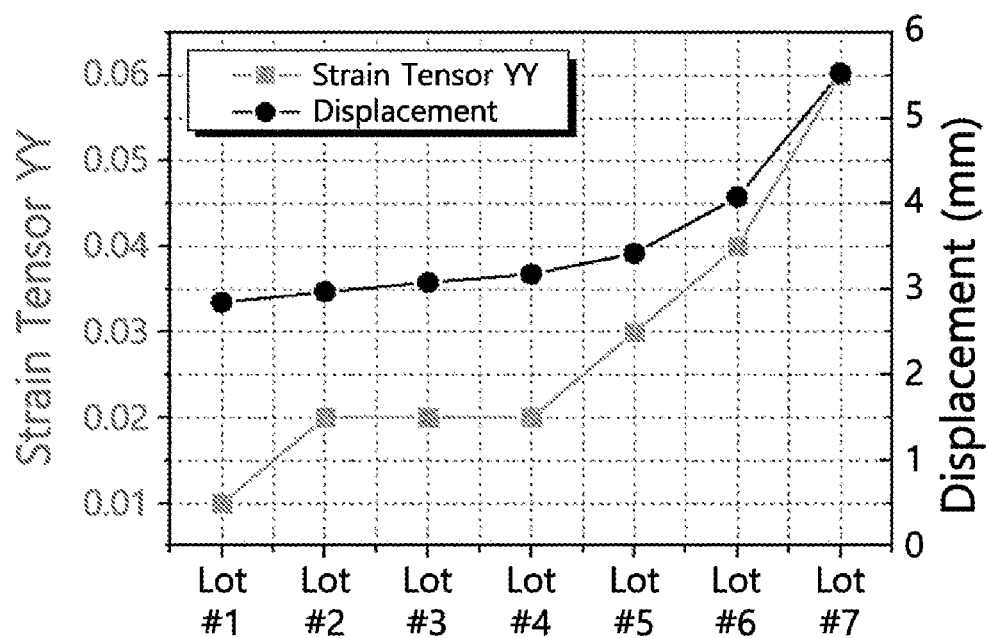
FIG. 18 is a diagram illustrating a relationship between a strain and a displacement of a grating interval according to a design of a through-hole of FIG. 16.

FIG. 18 is a diagram illustrating a relationship between a strain and a displacement of a grating interval according to a design of a through-hole of FIG. 16.

FIG. 18 illustrates a result of applying the same external force to the cantilevers 20 having various through-hole designs of FIG. 16.

Referring to FIG. 18, when the cantilever 20 has a through-hole extending in an extending axis direction of the cantilever 20 and extending in a direction perpendicular to the extending axis, a largest stress (V.M.S, von Mises stress) and a largest displacement of the grating interval Λ are caused, and thus, best performance is provided.

In addition, the inertial measurement system 1 is further configured to correct residual vibration.

After a single external force is applied to the cantilever 20 and is deformed, the cantilever 20 is continuously deformed even though an external force is no longer applied. Typically, such a phenomenon is referred to as residual vibration. An amplitude and a damping ratio of the residual vibration depends on a magnitude of an external force (or a magnitude of an acceleration of an object) or a mass and a stiffness of the cantilever.

When software of the measurement device 300 applies a cut-off for each residual vibration according to a magnitude of an acceleration of the object, in a situation where a movement of the object is dynamic, the IMU sensor 100 may not accurately detect the movement of the object.

The inertial measurement system 21 may reduce residual vibration in a structure aspect of the IMU sensor 100.

Figure 19:
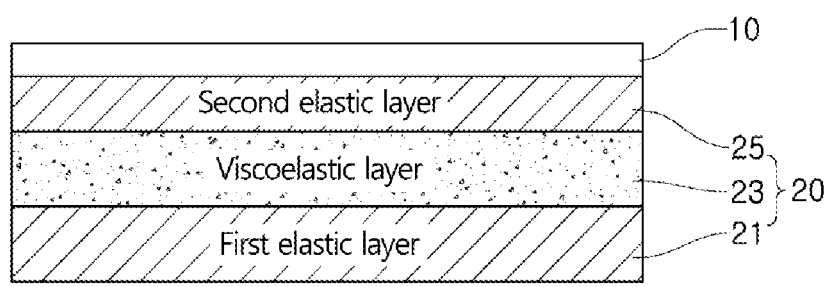
FIG. 19 is a cross-sectional view illustrating a cantilever having an EVE sandwich structure for reducing residual vibration, according to an embodiment of the present application.

FIG. 19 is a cross-sectional view illustrating a cantilever having an EVE sandwich structure for reducing residual vibration, according to an embodiment of the present application.

Referring to FIG. 19, the IMU sensor 100 may include at least one cantilever 20 having an EVE sandwich structure. The EVE sandwich structure includes a first elastic layer 21, a viscoelastic layer 23, and a second elastic layer 25. The FBG sensor 10 is located on the second elastic layer 25.

The viscoelastic layer is formed of a viscoelastic material having viscosity and elasticity. The viscoelastic material may include, for example, various viscoelastic materials and/or hyper-elastic polymer materials, a Tango material, a rubber material, thermoplastic polyurethane (TPU), or polydimethylsiloxane (PDMS).

As such, when an EVE sandwich structure in which a flexible polymer layer and a viscoelastic material (e.g., a Tango material) are combined is provided, damping may be improved and residual vibration may be reduced in a structural aspect. This is because when a Tango material is stacked, an equivalent stiffness of the cantilever decreases. As a result, it may contribute to increasing a sensitivity of the sensor. Also, the inertial measurement system 1 may reduce residual vibration due to the measurement device 300.

In an embodiment, the measurement device 300 may remove residual vibration through an input shaping filter. The input shaping filter that is a filter based on an impulse response may minimize or remove residual vibration due to a change in a reference command. When information about a vibration mode of a vibrometer is known in the measurement system 1, a collection of impulses for minimizing vibration according to the mode is set as an input shaper. The vibration mode of the vibrometer is determined by a material, a shape, etc. of the cantilever 20. The measurement device 300 may receive a vibration mode of a vibrometer based on a material, a shape, etc. of the cantilever 20, and may pre-set an input shaper corresponding to the vibration mode.

The input shaper may include two impulses having a time difference. The measurement device 300 may receive a wavelength spectrum set from the IMU sensor 100, and may remove a wavelength change due to residual vibration by applying the input shaper to the received wavelength spectrum set.

In another embodiment, the IMU sensor 100 may include at least three cantilevers 20. The IMU sensor 100 may include the three cantilevers 20 respectively having axes parallel to the x-axis, the y-axis, and the z-axis as extending axes. In this case, the inertial measurement system 1 may measure a linear acceleration and/or may perform a correction operation. The linear acceleration measurement and/or the correction operation has already been described, and thus, a detailed description thereof will be omitted.

As such, the measurement device 300 may measure a more accurate acceleration of an object, by performing an operation of correcting an error due to gravity, temperature, and/or residual vibration.

It will be apparent to one of ordinary skill in the art that the inertial measurement system 1 may include other elements not described herein. For example, the inertial measurement system 1 that is a diagnostic support system may include other hardware elements necessary for the operation described herein, including a network interface, an input device for data entry, and an output device for display, printing, or other data display. Alternatively, the system 1 may further include a connector that connects an optical fiber of the IMU sensor 100 to the light source 200, and/or a distributor (not shown) for distributing reflected light of the optical fiber of the IMU sensor 100 to the measurement device 300.

While the present application has been particularly shown and described with reference to embodiments thereof, they are provided for the purposes of illustration and it will be understood by one of ordinary skill in the art that various modifications and equivalent other embodiments may be made from the present application. It should be understood that such modifications are included in the technical scope of the present application. Accordingly, the true technical scope of the present application is defined only by the accompanying claims.

INDUSTRIAL APPLICABILITY

An inertial measurement unit (IMU) sensor according to embodiments of the present application is free from disturbance, and has low cost and high performance, without using an angular velocity sensor that has a lot of errors in linear acceleration/angular acceleration measurements. Accordingly, the IMU sensor has high industrial applicability in motion capture, autonomous electric vehicle market, and drone.

The invention claimed is:

1. An inertial measurement unit (IMU) sensor for measuring inertia of an object, the IMU sensor comprising:
a plurality of cantilevers each having a surface comprising a first axis and a second axis and configured to be deformable;
a core body coupled to the plurality of cantilevers; and
a plurality of strain sensors respectively located on the plurality of cantilevers and each configured to detect a bending strain of a corresponding cantilever,
wherein at least one from among the plurality of cantilevers is coupled so that a direction of the first axis of the surface of the at least one cantilever faces an x-axis with respect to the core body, at least one other cantilever from among the plurality of cantilevers is coupled so that a direction of the first axis of the surface of the at least one other cantilever faces a y-axis, and at least one other cantilever from among the plurality of cantilevers is coupled so that a direction of the first axis of the surface faces a z-axis,
wherein a linear acceleration or an angular acceleration for the object is measured based on a strain measurement result obtained from the plurality of strain sensors,
wherein the plurality of cantilevers comprise six cantilevers,
wherein each of the six cantilevers comprises a strain sensor aligned in a direction of the first axis on the surface,
wherein two cantilevers from among the six cantilevers are coupled so that an axis parallel to the x-axis is a normal direction of the surface of each of the two cantilevers among the six cantilevers, other two cantilevers are coupled so that an axis parallel to the y-axis is a normal direction of the surface of each of the other two cantilevers, and remaining two cantilevers among the six cantilevers are coupled so that an axis parallel the z-axis is a normal direction of the surface of each of the remaining two cantilevers.

2. The IMU sensor according to claim 1, wherein the six strain sensors form three strain sensor pairs for measuring a linear acceleration of each of three axes or three strain sensor pairs for measuring an angular acceleration having a rotation axis of each of the three axes,
wherein each of the six strain sensors is shared by a strain sensor pair for measuring a linear acceleration of any one of the three axes and a strain sensor pair for measuring an angular acceleration having one same axis as a rotation axis.

3. The IMU sensor according to claim 1, wherein, when an external force having a linear acceleration component or an angular acceleration component is applied to the object, at least two cantilever pairs from among the six cantilevers are deformed in response to the external force,
wherein, in the pair of cantilevers, axes corresponding to the first direction of one cantilever and the other cantilever are not parallel to each other.

4. The IMU sensor according to claim 3, wherein a cantilever pair deformed when a linear acceleration is applied to the object is coupled to the core body to have a surface direction facing a direction of the linear acceleration.

5. The IMU sensor according to claim 3, wherein a cantilever pair deformed when an angular acceleration is applied to the object is bent in a direction of the angular acceleration.

6. The IMU sensor according to claim 3, wherein, in the strain sensor pair for measuring the linear acceleration of any one of the three axes, one strain sensor is used to measure an angular acceleration having another axis of the three axes as a rotation axis, and the other strain sensor is used to measure an angular acceleration having a remaining axis of the three axes as a rotation axis.

7. The IMU sensor according to claim 1, wherein the core body has one surface with a larger area than other surfaces,
wherein at least one groove is formed in the one surface, and at least one of the plurality of cantilevers is coupled to the core body to be located in the at least one groove.

8. An inertial measurement unit (IMU) sensor for measuring inertia of an object, the IMU sensor comprising:
a plurality of cantilevers each having a surface comprising a first axis and a second axis and configured to be deformable;
a core body coupled to the plurality of cantilevers; and
a plurality of strain sensors respectively located on the plurality of cantilevers and each configured to detect a bending strain of a corresponding cantilever,
wherein at least one from among the plurality of cantilevers is coupled so that a direction of the first axis of the surface of the at least one cantilever faces an x-axis with respect to the core body, at least one other cantilever from among the plurality of cantilevers is coupled so that a direction of the first axis of the surface of the at least one other cantilever faces a y-axis, and at least one other cantilever from among the plurality of cantilevers is coupled so that a direction of the first axis of the surface faces a z-axis, wherein a linear acceleration or an angular acceleration for the object is measured based on a strain measurement result obtained from the plurality of strain sensors;

wherein the plurality of cantilevers comprise six or more cantilevers, wherein the core body has six surfaces having directions parallel to three axes as normal directions, and side surfaces of the six cantilevers are respectively fixed to the six surfaces of the core body.

9. The IMU sensor according to claim 1, wherein at least one of the plurality of cantilevers comprises a groove formed in one surface, wherein at least one of the plurality of strain sensors is located in the groove, wherein the IMU sensor further comprises a polymer layer formed on the at least one strain sensor located in the groove of the at least one cantilever.

10. The IMU sensor according to claim 1, further comprising a mass body fixed to a side surface opposite to one fixed side surface of the each of the plurality of cantilevers; and a plurality of through-holes formed between a portion where the mass body is projected onto a surface of the each of the plurality of cantilevers and a portion where the each of the plurality of cantilevers is coupled and fixed to the core body, wherein a sensing portion of the strain sensor located on the surface of the each of the plurality of cantilevers is located between the plurality of through-holes.

11. The IMU sensor according to claim 1, wherein the each of the plurality of cantilevers has a planar structure in which a portion located between one side and the other side of the each of the plurality of cantilevers has a smaller width than one end portion and the other end portion.

12. The IMU sensor according to claim 1, further comprising a temperature sensor located in the core body and configured to correct a change due to a temperature in a spectrum change of at least one of the six strain sensors.

13. The IMU sensor according to claim 12, wherein the temperature sensor is implemented as a fiber Bragg grating (FBG) sensor, wherein the FBG sensor of the temperature sensor is located in the core body in which a change in a wavelength spectrum of reflected light caused by an interval change between gratings due to a temperature change is greater than a change in a wavelength spectrum of reflected light caused by an interval change between gratings due to a deformation of the each of the plurality of cantilevers due to a movement of the object to which the IMU sensor is attached.

14. The IMU sensor according to claim 1, wherein at least one of the plurality of cantilevers comprises: a first elastic layer; a viscoelastic layer; and a second elastic layer, wherein the strain sensor is located on the second elastic layer.

15. The IMU sensor according to claim 13, wherein the FBG sensor that is an optical fiber-based strain sensor is used as the strain sensor, and the FBG sensor is a sensor in which gratings with different refractive indices are formed at a center of an optical fiber with at least one of a regular interval, an irregular interval, or a combination thereof; and a sensor that reflects only light of a specific wavelength according to the interval of the gratings; and the FBG sensor is configured to measure a strain when a grating interval and a wavelength change due to a change in a length and a temperature.

16. An inertial measurement system comprising:
the IMU sensor according to claim 13;
a light source configured to emit light to a plurality of FBG sensors; and
a measurement device configured to receive a wavelength spectrum set from the plurality of FBG sensors, wherein the wavelength spectrum set comprises a wavelength spectrum of reflected light output from each of the plurality of FBG sensors,
wherein the measurement device is configured to detect a change in a wavelength spectrum of reflected light caused by an interval change between gratings due to deformation of the each of the plurality of cantilevers caused by a movement of the object to which the IMU sensor is attached to calculate a strain corresponding to the movement of the object.

17. An inertial measurement system comprising:
an inertial measurement unit (IMU) sensor comprising:
a plurality of cantilevers each having a surface comprising a first axis and a second axis and configured to be deformable, wherein the plurality of cantilevers comprise six cantilevers,
a core body coupled to the plurality of cantilevers,
a plurality of strain sensors respectively located on the plurality of cantilevers and each configured to detect a bending strain of a corresponding cantilever, and
a temperature sensor located in the core body, configured to correct a change due to a temperature in a spectrum change of at least one of the six strain sensors, and implemented as a fiber Bragg grating (FBG) sensor;
a light source configured to emit light to a plurality of FBG sensors; and
a measurement device configured to receive a wavelength spectrum set from the plurality of FBG sensors, wherein the wavelength spectrum set comprises a wavelength spectrum of reflected light output from each of the plurality of FBG sensors,
wherein at least one from among the plurality of cantilevers is coupled so that a direction of the first axis of the surface of the at least one cantilever faces an x-axis with respect to the core body, at least one other cantilever from among the plurality of cantilevers is coupled so that a direction of the first axis of the surface of the at least one other cantilever faces a y-axis, and at least one other cantilever from among the plurality of cantilevers is coupled so that a direction of the first axis of the surface faces a z-axis,
wherein a linear acceleration or an angular acceleration for the object is measured based on a strain measurement result obtained from the plurality of strain sensors,
wherein the FBG sensor of the temperature sensor is located in the core body in which a change in a wavelength spectrum of reflected light caused by an interval change between gratings due to a temperature change is greater than a change in a wavelength spectrum of reflected light caused by an interval change between gratings due to a deformation of the each of the plurality of cantilevers due to a movement of the object to which the IMU sensor is attached,
wherein the measurement device is configured to detect a change in a wavelength spectrum of reflected light caused by an interval change between gratings due to deformation of the each of the plurality of cantilevers caused by a movement of the object to which the IMU sensor is attached to calculate a strain corresponding to the movement of the object, wherein the measurement device is configured to:

determine the each of the plurality of cantilevers deformed by the movement of the object by detecting the change in the wavelength spectrum of reflected light;

determine a deformation direction of the each of the plurality of cantilevers based on a wavelength spectrum change sign corresponding to the deformed cantilever; and measure a linear acceleration of the object based on the deformation direction and the strain.

18. The inertial measurement system according to claim 17, wherein, when there are at least two deformed cantilevers and deformation directions of the at least two deformed cantilevers comprise different axis directions, the measurement device is further configured to determine a rotation direction based on the deformation directions of the at least two deformed cantilevers, and additionally measure an angular acceleration of the object further based on the determined rotation direction and the linear acceleration.

19. The inertial measurement system according to claim 16, wherein the measurement device is configured to store information about a cantilever corresponding to each wavelength spectrum in the wavelength spectrum set, wherein the information about the cantilever comprises at least one of identification information of the cantilever, a bending axis of the cantilever, and a deformation direction of a surface of the cantilever.

* * * * *